(12) United States Patent
Peterson et al.

(10) Patent No.: US 7,689,680 B1
(45) Date of Patent: Mar. 30, 2010

(54) METHOD OF MODIFYING A CHECKSUITE

(75) Inventors: Lance Peterson, Ben Lomond, CA (US); Gregory Peters, Los Gatos, CA (US); Corinne Chen, Sunnyvale, CA (US); Jon Smith, Redwood City, CA (US); Roderick M. McChesney, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1247 days.

(21) Appl. No.: 10/600,472

(22) Filed: Jun. 19, 2003

Related U.S. Application Data

(60) Provisional application No. 60/390,064, filed on Jun. 19, 2002.

(51) Int. Cl.
*G06F 15/173* (2006.01)

(52) U.S. Cl. .................. 709/223; 709/225; 707/102; 717/100

(58) Field of Classification Search ............... 709/223, 709/226, 225; 707/102; 717/100
See application file for complete search history.

(56) References Cited

U.S. PATENT DOCUMENTS

| | | | |
|---|---|---|---|
| 5,333,308 A | 7/1994 | Ananthanpillai | |
| 5,504,801 A * | 4/1996 | Moser et al. | 379/29.01 |
| 5,557,740 A * | 9/1996 | Johnson et al. | 714/38 |
| 5,909,544 A | 6/1999 | Anderson, II et al. | |
| 5,964,891 A * | 10/1999 | Caswell et al. | 714/31 |
| 6,182,246 B1 * | 1/2001 | Gregory et al. | 714/38 |
| 6,216,237 B1 | 4/2001 | Klemm et al. | |
| 6,646,564 B1 | 11/2003 | Azieres et al. | |
| 6,711,135 B1 | 3/2004 | Dziekan et al. | |
| 6,771,606 B1 | 8/2004 | Kuan | |
| 7,139,676 B2 * | 11/2006 | Barford | 702/183 |
| 2003/0004974 A1 | 1/2003 | Wang et al. | |
| 2003/0009305 A1 * | 1/2003 | Eden | 702/119 |
| 2003/0028826 A1 | 2/2003 | Balluff | |
| 2003/0037289 A1 * | 2/2003 | Singh et al. | 714/38 |
| 2003/0046678 A1 | 3/2003 | Boxall et al. | |
| 2003/0101111 A1 | 5/2003 | Dang et al. | |
| 2003/0120776 A1 | 6/2003 | Avvari et al. | |
| 2003/0204784 A1 * | 10/2003 | Jorapur | 714/38 |

(Continued)

OTHER PUBLICATIONS

U.S. Appl. No. 10/600,858, Office Action dated Jul. 13, 2007, 18 pages.

(Continued)

*Primary Examiner*—Saleh Najjar
*Assistant Examiner*—Thuong (Tina) T Nguyen
(74) *Attorney, Agent, or Firm*—Blakely, Sokoloff, Taylor & Zafman LLP

(57) ABSTRACT

A method and apparatus for defining, creating, and applying checks to multiple computers simultaneously is disclosed. In a network comprised of multiple computers capable of being linked together, a number of parameters to be monitored are defined. Then a number of checks corresponding to the one or more defined parameters are created. Each check is a set of computer executable instructions to monitor a defined parameter of the one or more defined parameters. After the checks are created, one or more checksuites that each include two or more of the created checks may be created. One or more checksuites may be designated for deployment and applied to one or more of the multiple network computers.

33 Claims, 18 Drawing Sheets

U.S. PATENT DOCUMENTS

2003/0212982 A1* 11/2003 Brooks et al. ............... 717/100
2006/0206870 A1* 9/2006 Moulden et al. ............ 717/124

OTHER PUBLICATIONS

Red Hat, Inc. Office Action for U.S. Appl. No. 10/600,858 mailed Dec. 4, 2006.
Red Hat, Inc. Office Action for U.S. Appl. No. 10/600,858 mailed Apr. 9, 2007.
Red Hat, Inc. Office Action for U.S. Appl. No. 10/600,858 mailed Jul. 13, 2007.
Red Hat, Inc. Office Action for U.S. Appl. No. 10/600,858 mailed Dec. 28, 2007.
Red Hat, Inc. Office Action for U.S. Appl. No. 10/600,858 mailed Jun. 12, 2008.
Red Hat, Inc. Office Action for U.S. Appl. No. 10/600,858 mailed Nov. 21, 2008.

* cited by examiner

METHOD OF MODIFYING A CHECKSUITE

REFERENCE TO RELATED APPLICATION

This application claims the benefit of U.S. Provisional Application No. 60/390,064, filed Jun. 19, 2002.

FIELD OF THE INVENTION

The field of the invention relates generally to computer networks and, particularly, to methods and apparatus for monitoring computer networks.

BACKGROUND OF THE INVENTION

Computer networks are monitored to ensure continuous availability, optimum performance, and the efficient use of network resources. However, the monitoring of large networks is both labor-intensive and costly where the network nodes are configured, monitored, and updated on a node-by-node basis.

Monitoring computer networks generally involves building, installing, configuring, operating, and updating specially designed computer software programs that test various network specific parameters such as available memory, response time, operational status, and similar parameters. The set of computer instructions that tests (e.g., monitors) a single parameter, such as available disk space, for example, is called a check.

The computer software programs mentioned above may contain one or more checks targeted to (or associated with) particular operating systems and/or particular software programs running within a particular operating system. For example, a Macintosh operating system includes parameters specific to that operating system that may be monitored. Thus, a software program that includes one or more checks targeted to a Macintosh operating system may be developed. Similarly, a software program that includes one or more checks targeted to a Microsoft Windows operating system may be developed. However, the checks targeted to the Macintosh operating system may be different than the checks targeted to a Microsoft Windows operating system.

Regardless of the operating system and/or software programs used, the prior art teaches building, configuring, and updating checks on a computer-by-computer basis. In a large network, or in instances where a large number of checks are to be applied, this approach is disadvantageous because the building, configuring, and updating of checks individually is costly, labor-intensive, and unnecessarily repetitive. The prior art does not leverage network commonalities (e.g., an operating system and/or computer programs) common to two or more network nodes and does not permit the simultaneous deployment of multiple checks to groups of network nodes.

FIG. 1 is a diagram of a computer network 100 illustrating the arrangement of servers 101-109 within the infrastructure's protocol, application, and database layers 110-112, respectively. A protocol is an agreed-upon format for transmitting data between two devices. The protocol determines the type of error checking to be used; the data compression method, if any; how the sending device will indicate that it has finished sending a message; and how the receiving device will indicate that it has received a message.

An exemplary protocol is TCP/IP (Transmission Control Protocol). TCP is one of the main protocols in TCP/IP networks. Whereas the IP protocol deals only with packets, TCP enables two network computers to establish a connection and exchange streams of data. TCP not only guarantees delivery of data, but also guarantees that packets will be delivered in the same order in which they were sent.

Database layer 112 illustratively includes three servers (network computers) 107, 108, and 109 that run database and database management software manufactured by Oracle Corporation of Redwood City, Calif., for example.

Database layer 112 includes information collected from a variety of servers and organized in such a way that servers 104-106 can quickly select a piece or pieces of data stored in one or more databases. The databases in database layer 112 may be traditional databases organized by fields, records, and files, or Hypertext databases, in which any object (e.g., an item that can be selected and manipulated) can be linked to any other object. Objects can include shapes and pictures that appear on a display screen as well as less tangible software entities. In object-oriented programming, for example, an object is a self-contained entity that consists of both data and procedures to manipulate that data.

Application layer 111 includes servers (network computers) 104-106, which run a particular operating environment, for example, SOLARIS™, a Unix-based operating environment developed by Sun Microsystems of Mountain View, Calif. An operating environment is the state of a computer, usually determined by which programs are running, as well as by basic hardware and software characteristics. For example, a program run in a Unix environment means that the program is run on a computer that has the Unix operating system installed. Another term for environment in this sense is platform.

Servers 104-106 in application layer 111 also run middleware, which is a software used to connect two otherwise separate applications. This allows users to request data from a database using forms displayed on a browser, such as Internet Explorer made by Microsoft Corporation, of Redmond, Wash. Use of middleware also enables the web server to return dynamic web pages based on the user's requests and profile. Servers 104-106 in application layers 111 may run Dynamo™, an application server middleware manufactured by Advanced Technology Corporation of Cambridge, Mass., that links web servers 101-103 with the database layer 112.

The specific architecture of network 100 may vary depending on a number of factors such as size, hardware constraints, software types, etc., but in an illustrative NT architecture, certain clusters (e.g. farms) of servers are allocated to performing certain tasks. There are several disadvantages associated with growing or scaling NT architecture. First, a computer added to (or deleted from) a particular cluster must be individually configured to duplicate the same functionality as other computers in that cluster. Thus, the computers within each cluster are not made part of a monitoring group that checks basically the same things on the computers comprising that group.

Because users do not consider the types of computers available, the types and levels of clusters involved, and what types of ways each level (or portion thereof) and/or each cluster should be monitored, before individual computers are configured, the checks are not defined at the cluster or operational level, as shown in FIG. 2. Instead, checks are defined at the individual computer level. Additionally, the checks are not simultaneously applied to all computers within that cluster or level. Instead, the checks are applied to each separate computer individually.

FIG. 2 is a flow diagram illustrating the conventional application of individual checks on a case-by-case, computer-by-computer basis, and will be described with reference back to FIG. 1.

At Time 1, server 101 is accessed, step 201. Then, LINUX™ checks 202 and Apache checks 203 are built and applied, steps 204, 205. LINUX™ checks 202 are individual checks specific to the LINUX™ operation system. Similarly, APACHE™ checks 203 are individual checks specific to the APACHE™ web server application program.

At Time 2, server 102 is accessed, step 206, and LINUX™ checks 207 and Apache checks 208 are built and applied, steps 209-210.

At Time N–1, application server 106 is accessed, step 211, and SOLARIS™ checks 212 and DYNAMO™ checks 213 are constructed and applied steps 214 and 215. N is an integer greater than 1.

At Time N, database server 107 is accessed, step 216 and ORACLE™ checks 217 are built and applied, step 218. ORACLE™ checks 217 are individual checks particular to Oracle database system.

As may be appreciated, building individual checks on a case-by-case, computer-by-computer basis consumes time and money and unnecessarily duplicates checks previously built and applied to other computers.

SUMMARY

A method and apparatus for defining, creating, and applying checks to multiple computers simultaneously is disclosed. In a network comprised of multiple computers capable of being linked together, a number of parameters to be monitored are defined. Then a number of checks corresponding to the one or more defined parameters are created. Each check is a set of computer executable instructions to monitor a defined parameter of the one or more defined parameters. After the checks are created, one or more checksuites that each include two or more of the created checks may be created. One or more checksuites may be designated for deployment and applied to one or more of the multiple network computers.

BRIEF DESCRIPTION OF THE DRAWINGS

Various aspects of the present invention are set forth by way of example, and not limitation, in the figures of the accompanying drawings, in which.

DETAILED DESCRIPTION

Figure 1:
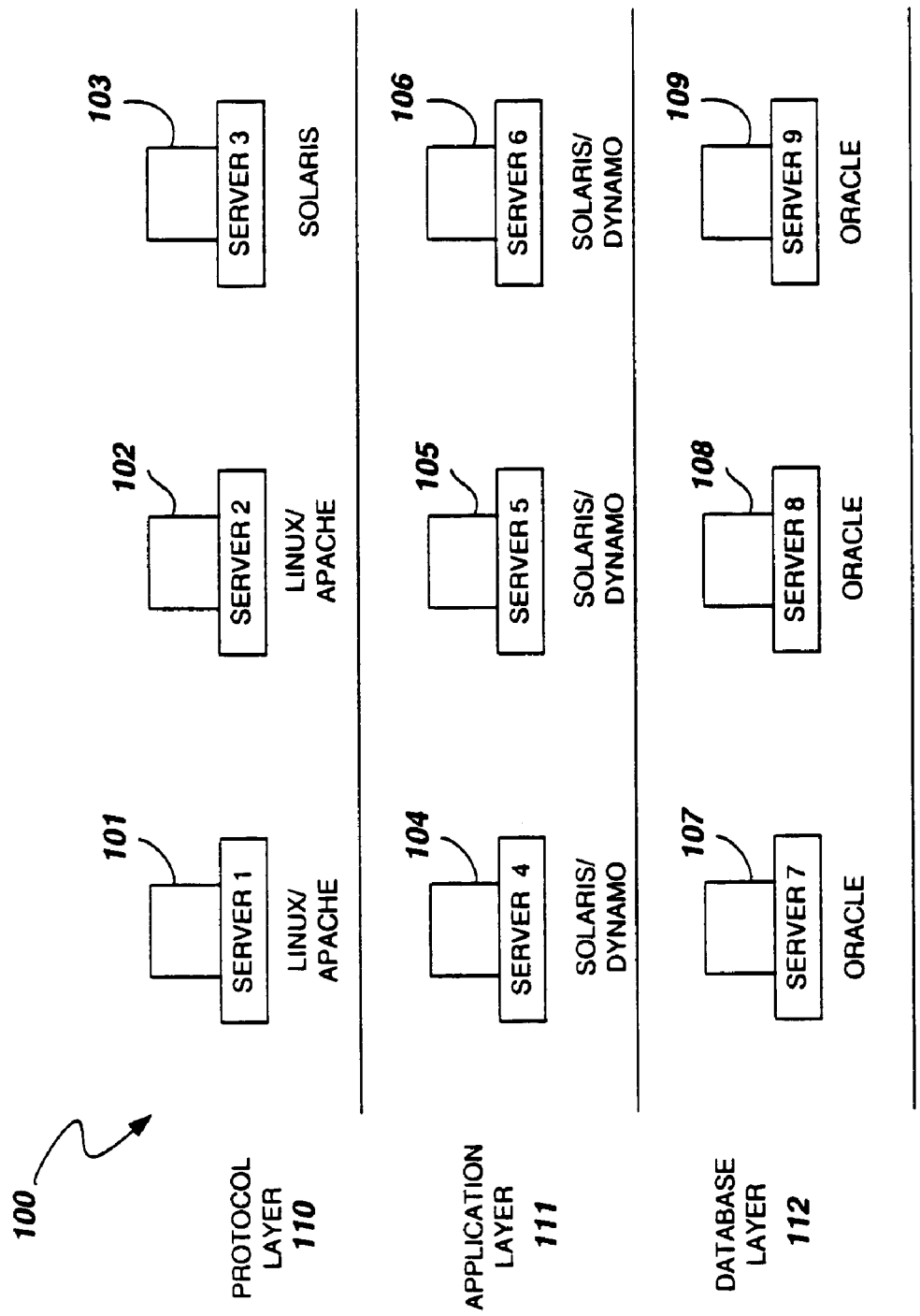
FIG. 1 is a diagram of a computer network illustrating the arrangement of servers within the network's web, application, and database layers.
Figure 2:
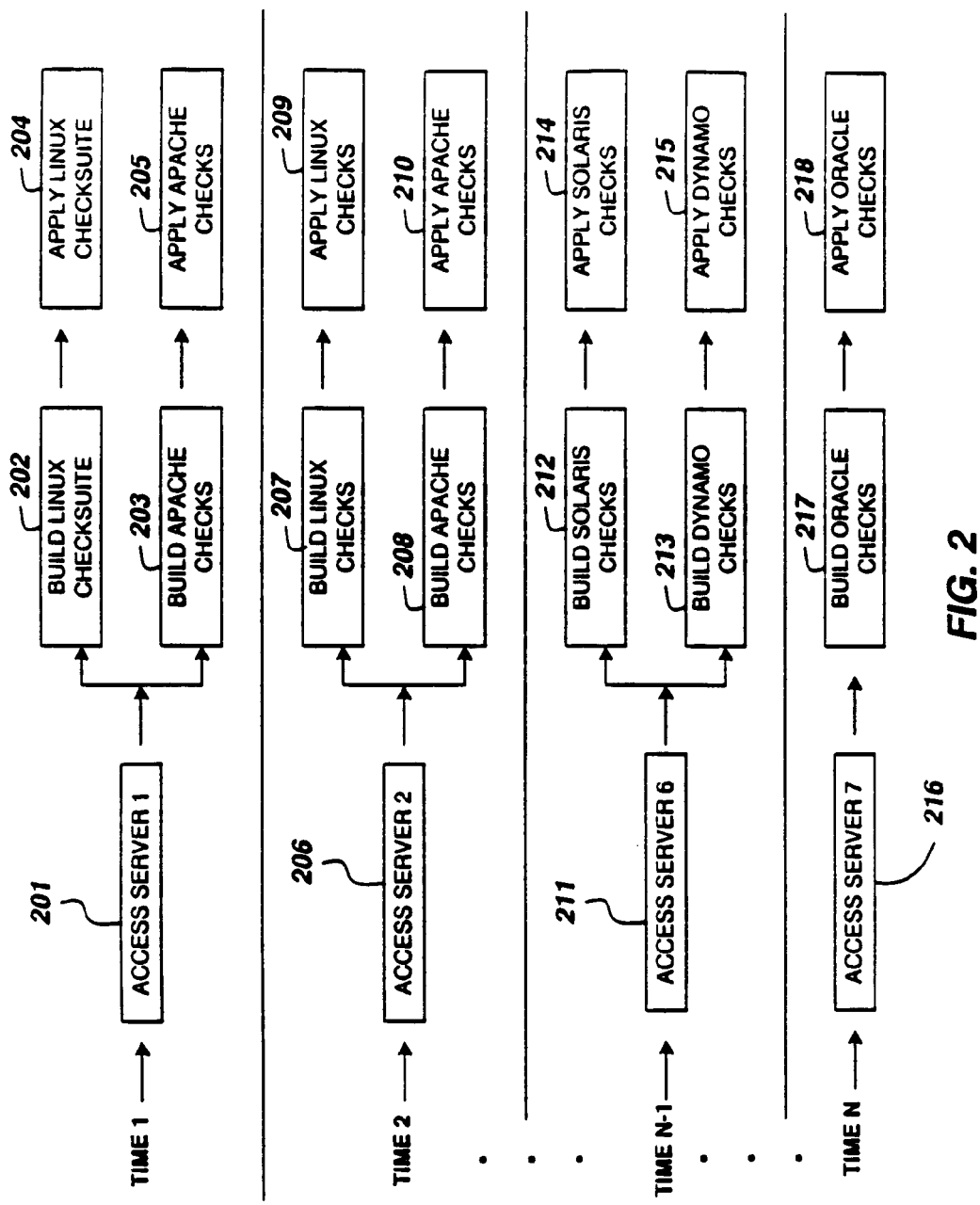
FIG. 2 is a flow diagram illustrating the conventional application of individual checks on a case-by-case, computer-by-computer basis.

A method and apparatus for building, editing, storing, and applying checksuites to a computer network is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail in order not to unnecessarily obscure the present invention.

Reference is made to the accompanying drawings in which like references indicate similar elements, and in which is shown by way of illustration, specific embodiments in which the invention may be practiced. These embodiments are described in sufficient detail to enable those skilled in the art to practice the invention. The following detailed description is, therefore, not to be taken in a limiting sense, and the scope of the invention is defined only by the appended claims.

Unless specifically stated otherwise, as apparent from the following discussions, it is appreciated that throughout the detailed description discussions utilizing terms such as "processing," "computing," "calculating," "determining," or the like, refer to the action and/or processes of a computer or computing system, or similar electronic computing device. Such a device manipulates and/or transforms data represented as physical, such as electronic quantities within the computing system's registers and/or memories into other data similarly represented as physical quantities within the computing system's memories, registers or other such information storage, transmission or display devices.

The present invention may be provided as a computer program product, or software, that may include a machine-readable medium having stored thereon instructions, which may be used to program a computer system (or other electronic devices) to perform a process according to the present invention. The machine-readable medium may include, but is not limited to, any type of disk including floppy disks, optical disk, CD-ROMs, and magnetic-optical disks. The machine-readable medium may also include, but is not limited to, read-only memories (ROMs), random access memories (RAMs), electrically programmable read only memories (EEPROMs), magnetic or optical cards, or any other type of media suitable for storing electronic instructions, and capable of being coupled to a system bus for a computing device.

As previously mentioned, a check is a set of computer instructions that tests (e.g. monitors) a single parameter, such as available disk space, for example. A checksuite is a grouping of multiple (1-N) checks that is capable of being applied to multiple computers within a network simultaneously. In the above sentence, N is an integer greater than 0.

A checksuite includes only checks targeted to a particular operating system. For example, a Linux checksuite includes only checks specific to the Linux operating system. Alternatively, checksuites specific to other operating systems and/or software programs may be configured. In another embodiment, a checksuite includes multiple groupings of checks that are targeted to multiple particular operating systems and/or software programs. For example, a checksuite may include a first grouping of Unix (operating system) specific checks and a second grouping of Dynamo (software) specific checks.

An advantage of using a checksuite is that configuration of the targeted network computers is made easier and faster because the checksuite is applied to multiple computers simultaneously. After a checksuite has been applied, individual checks may be modified, added to, or removed from one or more individual computers, individually or concurrently.

Figure 3:
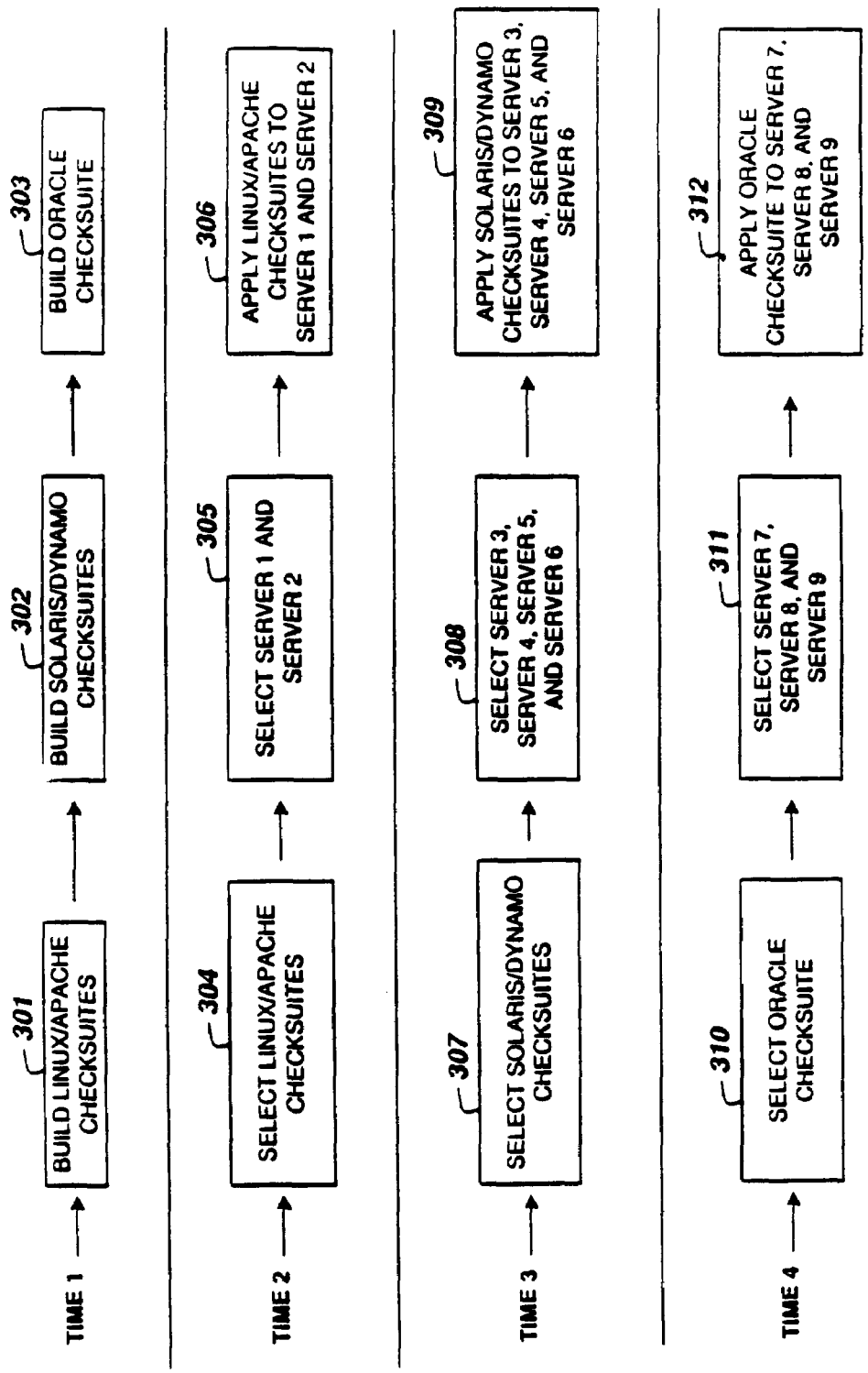
FIG. 3 is a flow diagram illustrating the construction and application of a plurality of checksuites across a plurality of network computers simultaneously, according to one embodiment of the present invention.

FIG. 3 is a flow diagram illustrating one embodiment of a deployment of multiple checksuites across multiple network computers. At Time 1, a web server checksuite 301, a middleware checksuite 302, and database checksuite 303, are constructed and stored on a server. As shown in FIGS. 7-13, a software program hosted on a network computer connected to an Internet web server and displayed to a user permits concurrent selection of multiple checksuites and multiple target network computers. A target network computer is one selected to receive deployment of a checksuite. The multiple network computers may be wirelessly linked, or may be linked together using fiber-optic or other types of cables.

Referring again to steps 304 and following of FIG. 3, web server checksuites 301 are selected for deployment, step 304. Network computers 101 and 102 are selected to receive deployment of web server checksuite 301, step 305; and the designated checksuites are simultaneously applied to servers 101 and 102, step 306. It will be appreciated that servers 101 and 102 can each be later accessed and customized individually, for example, by adding, modifying, or deleting individual checks within the checksuite(s) applied to each individual computer.

In a similar manner, at Time 3, the middleware checksuites may be designated for deployment, step 307. Network computers 103, 104, 105, and 106 are each selected, and the designated middleware checksuites are simultaneously applied to network computers 103-106. As described above, each of network computers 103-106 may be accessed and customized individually at a later time. As used herein, the term simultaneous means that two or more steps are executed at the same point in time or that two or more steps are executed with a time delay, the time delay being a space in time of variable length separating execution of the two or more steps.

Likewise, at Time 4, a database checksuite is selected, step 310. Network computers 107, 108, and 109 are selected, step 311, and the database checksuite is applied to network computers 107-109 simultaneously, step 312.

Figure 14:
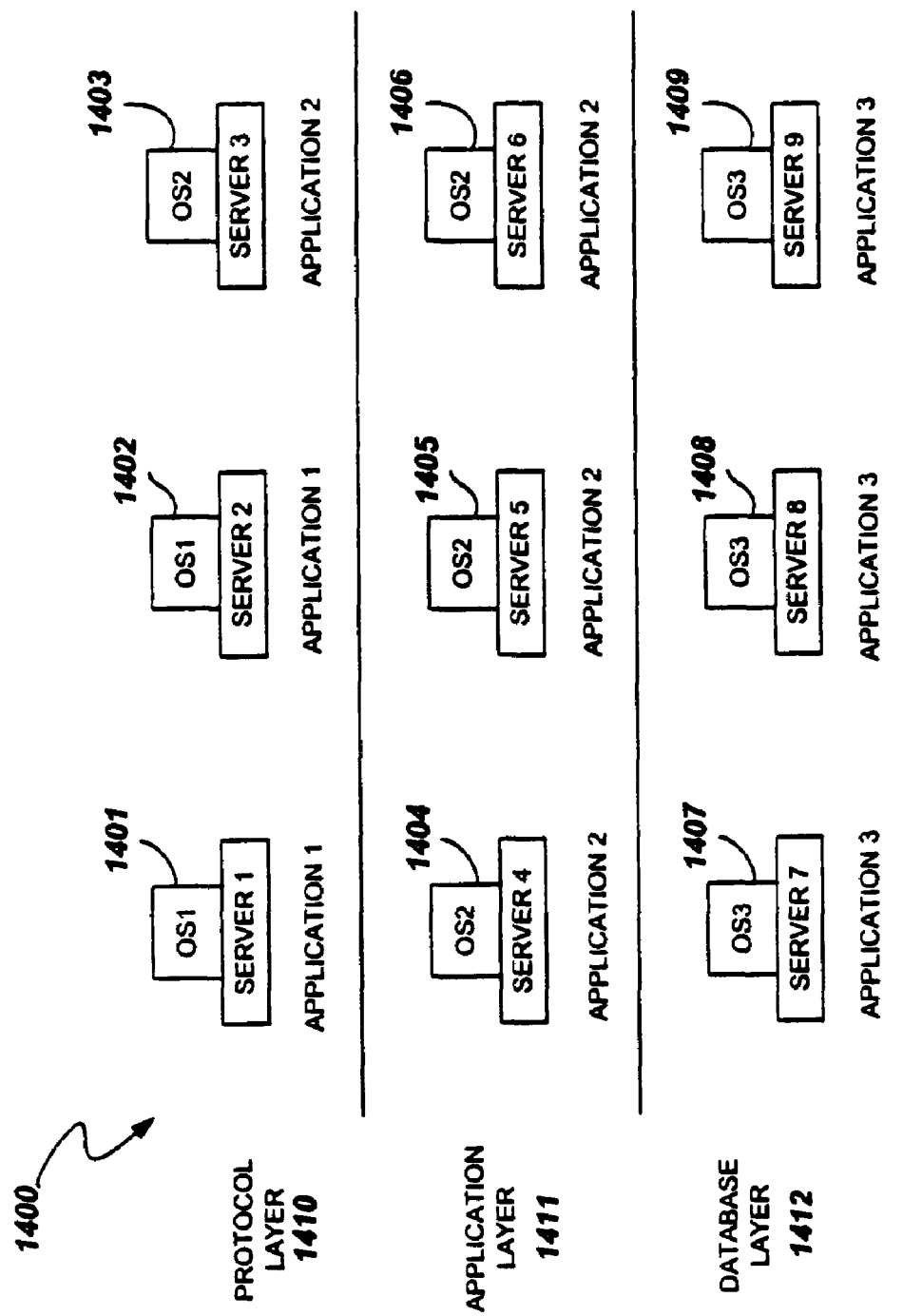
FIG. 14 is a diagram of a computer network illustrating the arrangement of servers within the network's web, application, and database layers.

Referring to FIG. 14, it will be appreciated that one or more checksuites may be applied to a variety of network computer selection patterns simultaneously. Alternatively, one or more checksuites may be applied to a variety of network computer selection patterns in a non-linear fashion. In other words, the deployment of checksuites is not confined to network computers within the same layer or to network computers that are "adjacent" to each other. Rather, checksuites may be applied vertically through one or more layers 1410-1412, horizontally, or in both directions simultaneously. For example, a web server checksuite may be applied to network computers 1403 and 1406 (vertically). Alternatively, the web server checksuite may be applied to network computers 1404-1406 (horizontally). Alternatively, the web server checksuite may be simultaneously applied to network computers 1403-1406 (combination). Alternatively, the web server checksuite may be simultaneously applied to non-adjacent network computers 1404 and 1406. In sum, the present invention is not limited to any one particular type of checksuite deployment.

As shown in FIG. 14, network 1400 includes multiple network computers 1401-1409. Network computers 1401-1409 are organized by function. Thus, Protocol Layer 1410 includes network computers 1401-1403. Of computers 1401-1403, computers 1401-1402 run Application Program 1. Illustratively, Application Program 1 is a Linux or Apache software program. Alternatively, other software programs may be used. Computer 1403 runs Application Program 2. Illustratively, Application Program 2 is SOLARIS, a Unix-based operating environment developed by Sun Microsystems of Mountain View, Calif. Alternatively, other operating environments may be used.

Application Layer 1411 includes servers 1404-1406, each of which run a middleware Application Program 2 as described above. Middleware is a software used to connect two otherwise separate applications. This allows users to request data from a database using forms displayed on a browser, such as Internet Explorer made by Microsoft Corporation, of Redmond, Wash. Alternatively, other browsers, such as Netscape Navigator made by Netscape Communications of Mountain View, Calif., may also be used. Servers 1404-1406 may run Dynamo™, an application server middleware manufactured by Advanced Technology Corporation of Cambridge, Mass., that links servers 1401-1403 with the database layer 1412. Alternatively, other middleware products such as iPlanet™, Cold Fusion™, and IBM Weblogic™ are used to link a server 1401 with a database server 1407.

Database Layer 1412 includes computers 1407-1409, each of which run Application 3. Illustratively, Application Program 3 is a database operating system or a database management system manufactured by Oracle Corporation of Redwood City, Calif. Alternatively, other types of database and database management systems may be used.

Protocol layer 110 includes web servers 101, 102 and 103, which are computers having an IP address that deliver (serve up) web pages for display to a user. Alternatively, web servers 101-103 may each have a domain name. The IP address identifies computer device on a TCP/IP (Transmission Control Protocol) network, and is a 32 bit numeric address written as four 8-bit numbers, separated by periods, that may range from 0 to 255. Thus 1.220.10.95 could be an IP address. One or more IP addresses may be represented by a domain name. The domain name is used in URLs (Uniform Resource Locator) to identify particular web pages. Thus, an entry of a URL, such as http://www.nocpulse.com/index.html, causes a web browser to send a request to the server whose domain name is nocpulse.com. The server then fetches the page index.html and sends it to the browser, where it is displayed for the user.

Virtually any computer may be turned into a server by installing software and connecting the computer to the Internet, a global network connecting millions of computers. Illustratively, network 1400 may be an intra-network (local area network (LAN)) or an extra-network (wide area network (WAN)). The computers forming an intra-network are geographically close to each other (e.g. in the same building or campus of buildings), while the computers forming an extra network are further apart and connected by cables or radio waves.

In network 1400, servers 1401 and 1402 run APACHE™ in a LINUX™ operating environment. APACHE™ is a popular web server application program first developed in 1995, freely distributed over the Internet, and originally written for Unix.

However, newer versions run under OS/2, Windows and other platforms. LINUX™ is a freely distributable open-source implementation of Unix that runs on a number of platforms, including Intel and Motorola microprocessors, as well as IBM PC's, Macintoshes, and Amigos. As shown in FIG. 14, web server 1403 may run the Solaris operating system in combination with the Dynamo program.

In one embodiment, following deployment of a checksuite, one or more unwanted checks within the deployed checksuite (e.g. the checksuite loaded onto the target network computer) are de-selected and permanently removed from the checksuite. Removed checks are re-established by reinstalling the original checksuite, but reinstallation erases any prior customizations (also called differences). A customization (or difference) is a change made to the check or checksuite following the deployment of that check or checksuite. For example, a checksuite including two or more checks may be applied to five computers simultaneously. Thereafter, one or more of the five computers may be accessed and checksuite installed thereon differenced by adding, deleting, or modifying one or more of the individual checks that are included within the deployed checksuite. In one embodiment, reinstallation of an original checksuite (or reapplication of a modified original checksuite) preserves any prior customizations (e.g., differences) made to the checksuite deployed on the target network computer(s).

In one embodiment, checksuites are user-configurable. For example, users may define a checksuite by specifying one or more of the following parameters: the type of monitoring to be performed (periodic, continuous, etc.), the threshold reporting levels, the types of notifications to be activated when a problem (or problems) is detected, and similar parameters. This user-specific information may be saved in a master location (or locations) so that later modifications or changes to this information may be simultaneously propagated to all applied checksuites. An applied checksuite is one that runs on one or more network computer computers.

For example, consider an operating system checksuite that runs on ten network computer computers simultaneously. The checksuite includes four individual checks specific to that operating system. A user desiring to add a fifth check to each of the ten target computers, simply designates the ten target computers, adds the new check to the operating system checksuite, designates the modified checksuite for deployment, and applies the checksuite to all ten target computers. In one embodiment, deployment occurs simultaneously. In another embodiment, deployment occurs with time-delayed execution of the checks included in the checksuite.

Checks and checksuites may be created externally or internally by users. Externally means that the user accesses a remote Internet web server, which provides a graphical user interface for display on a flat panel display or other viewing device. Internally means that the user accesses a local server, which provides a graphical user interface for display on a flat panel display. The flat panel display and associated user input devices, such as a keyboard and a mouse, may be coupled to a remote Internet server, or to a local server.

Users who have pre-determined monitoring parameters may use the graphical user interface to access one or more check or checksuite templates (e.g., best checks for NT, best checks for Dynamo, etc.) that are generic. In one embodiment, each generic template includes one or more individual checks specific to the type of targeted operating system and/or software programs. A general template may be selected for deployment without modification (as is). Alternatively, a generic template may be modified before deployment of the template to one or more remote target computers.

In one embodiment, checks may be constructed ex nihilo (from scratch). Constructing checks from scratch involves 1) defining the parameter(s) to be monitored, 2) programming the sets of computer executable code that make up each individual check, and 3) storing the programmed checks in a computer-readable medium for later retrieval. The parameter(s) may be unique to a particular operating system or to a particular software program. Alternatively, the parameter(s) may overlap between similar operating systems or software programs. In one embodiment, the programmed checks are stored in a computer memory. In one embodiment, the programmed checks may be stored in other manners, for example, on magnetic and optical disks.

One method of establishing checks and checksuites involves 1) receiving one or more defined parameters to be monitored in a network comprised of multiple computers capable of being linked together, 2) receiving a number of checks corresponding to the one or more defined parameters, and 3) receiving one or more checksuites, each checksuite including two or more of the received checks. The term receiving means that the checks and checksuites may be accepted from a remote device over a network such as the Internet or that the checks and checksuites may be accepted from an input device coupled to a server interface. Thus, a server may receive checks and checksuites (or computer-executable instructions to build them) from a remote computer over the Internet or other type of extra-net. Additionally, a server may receive checks and checksuites (or computer-executable instructions to build them) from an input device coupled to a server interface or other type of local communications mechanism. Illustratively, examples of a local communication mechanism include a Bluetooth network or two or more computers coupled together to form a LAN.

Figure 4:
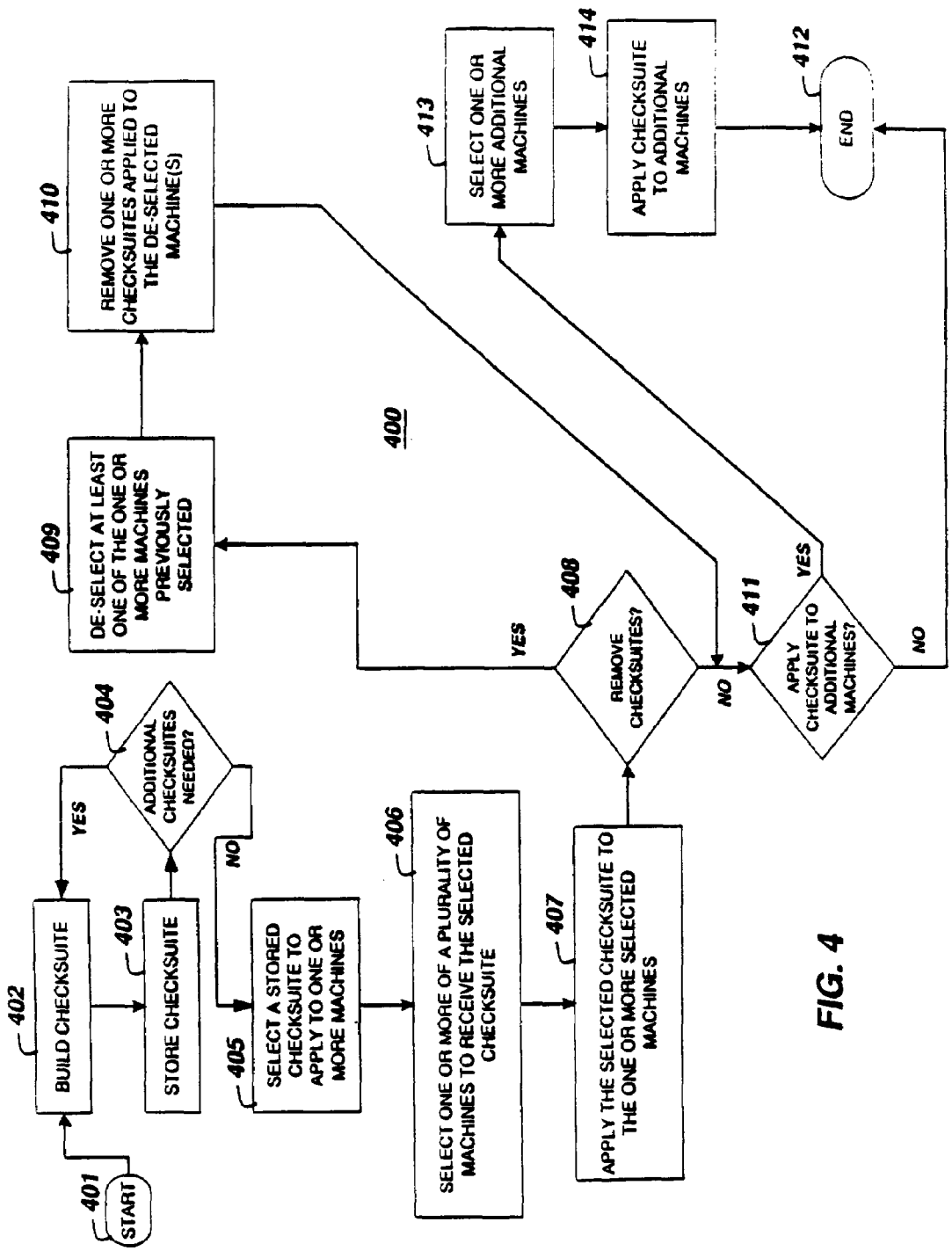
FIG. 4 is a flow chart of one embodiment of a method useable with the present invention.

FIG. 4 is a flow chart of one embodiment of a method 400 useable with the present invention. Beginning at step 401, a checksuite is created, step 402, by defining (and/or programming) individual checks and grouping the checks together. Once completed, the checksuite is stored, step 403. If additional checksuites are needed, step 404, the method loops back to step 402, and new checksuites are created and stored until no additional checksuites are needed.

In use, one or more stored checksuites are designated for deployment, step 405, and multiple network computers are also selected to receive the designated checksuite(s), step 406. At step 407, the selected checksuites are applied to the one or more selected machines. In one embodiment, designation of checksuites and selection of network computers includes positioning moveable display cursor over a reactive portion of a display device and activating a cursor control to toggle the reactive portion of the display device.

The target network computers and/or designated checksuites are selected from a list of icons appearing in a browser, or other network-enabled graphical user interface. Alternatively, the target network computers and/or designated checksuites are selected from a pull down menu. Once the target network computers are selected, the previously selected checksuite(s) are applied to the one or more selected computers. As used here, the term "applied to" encompasses downloading, uploading, loading into memory, providing, or any other way of associating a checksuite with one or more individual network computers.

To modify or remove a deployed checksuite, step 408, one or more of the target network computers may be de-selected from the target group, step 409. In one embodiment, the computer(s) to be de-selected are highlighted in a browser, or other network-enabled graphical user interface. At step 410, the checksuite(s) previously applied to the now de-selected computers are removed. In one embodiment, this is accomplished by clicking a "remove" button (e.g., icon appearing in a browser) or by typing a pre-determined key on a keyboard or keypad.

If no checksuites are to be removed, Method 400 proceeds to step 411. If the selected checksuite is not to be applied to additional computers, Method 400 terminates, step 412. On the other hand, if the selected checksuite is to be applied to additional computers, those computers are selected, step 413, and the checksuite is applied to the additional computers, step 414. Once the additional computers have received the selected checksuite, Method 400 terminates, step 412.

Figure 5:
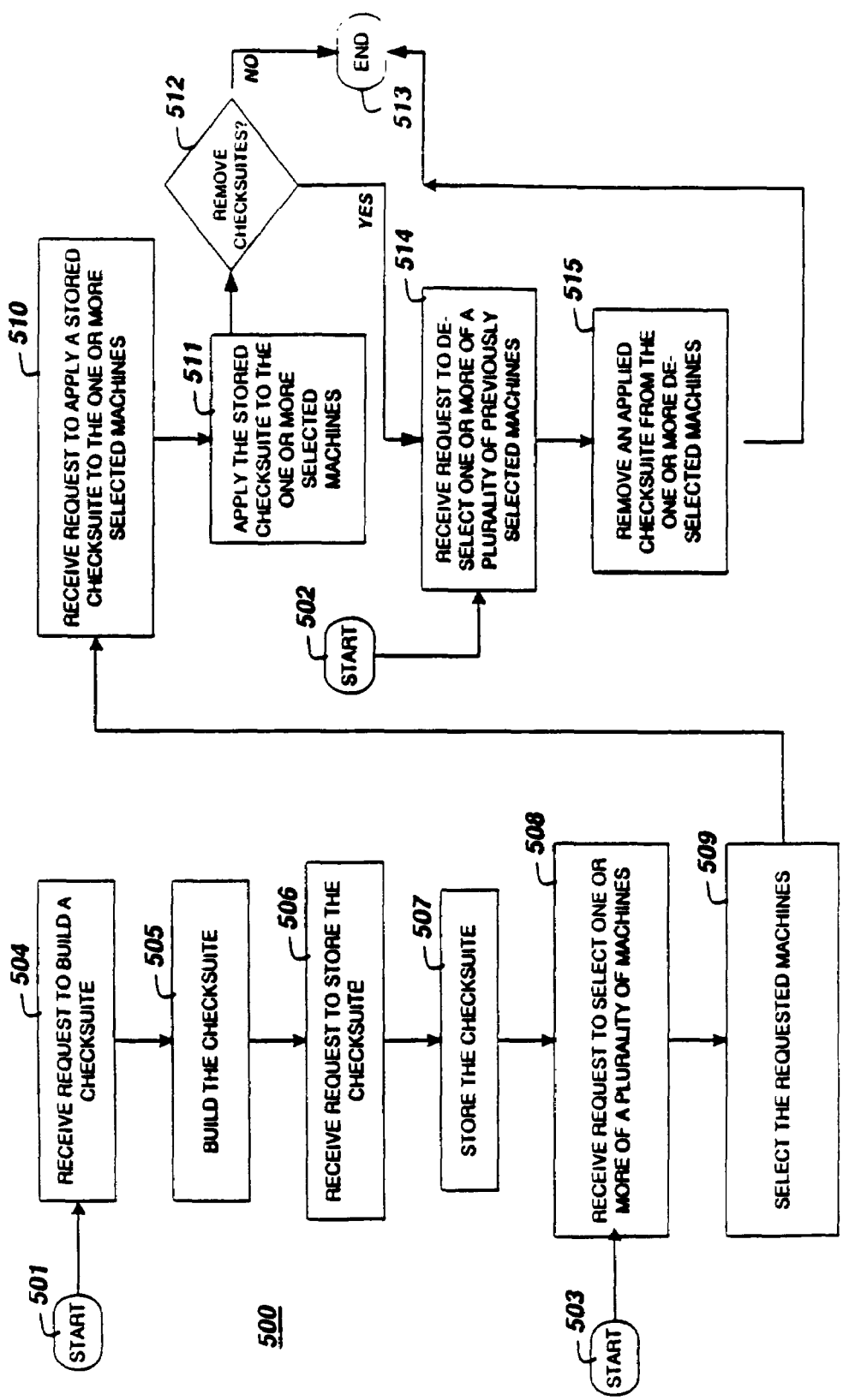
FIG. 5 is a flow chart of one embodiment of a method useable with the present invention.

FIG. 5 is a flow chart of one embodiment of a Method 500 useable with the present invention. Method 500 often begins at start step 501, but may alternatively begin at start step 502 or start step 503. From step 501, a network (or extra-network) computer or network device receives a request to build a checksuite, step 504. This request may be inputted to the computer by a local or remote user. Once the request is received, step 504, a checksuite is built, step 505, using objects and other types of software and/or programming languages. Once a checksuite is built, a request to store the constructed checksuite may be received, step 506. If so, the checksuite is stored, step 507, by saving the code comprising it to a permanent digital or electronic memory or by saving the code to magnetic, digital or optical storage media, such as a hard disk, floppy disk, zip disk, DVD-R, DVD-RW disk, CD-R, or CD-RW disk.

A request to select one or more of a plurality of network computers is received at step 508. At step 509, the requested computers are selected. A request to apply a stored checksuite to the one or more selected computers is received, step 510, and the stored checksuite is applied to the one or more selected computers, step 511. If no checksuites are to be removed, step 512, method 500 terminates, step 513.

When one or more applied checksuites are to be removed (disassociated), step 512, a request to de-select one or more previously selected computers is received, step 514.

Upon receipt of a request to disassociate an applied checksuite, the designated applied checksuite (or checksuites) is removed, step 515, from the designated target network computer(s). As used herein, the term "remove" means to erase or otherwise disassociate selected checksuite(s) from an individual network computer, its short and long term memory, and/or any associated magnetic, digital, or optical storage media. Once the checksuite(s) have been removed, method 500 ends at step 513.

Figure 6A:
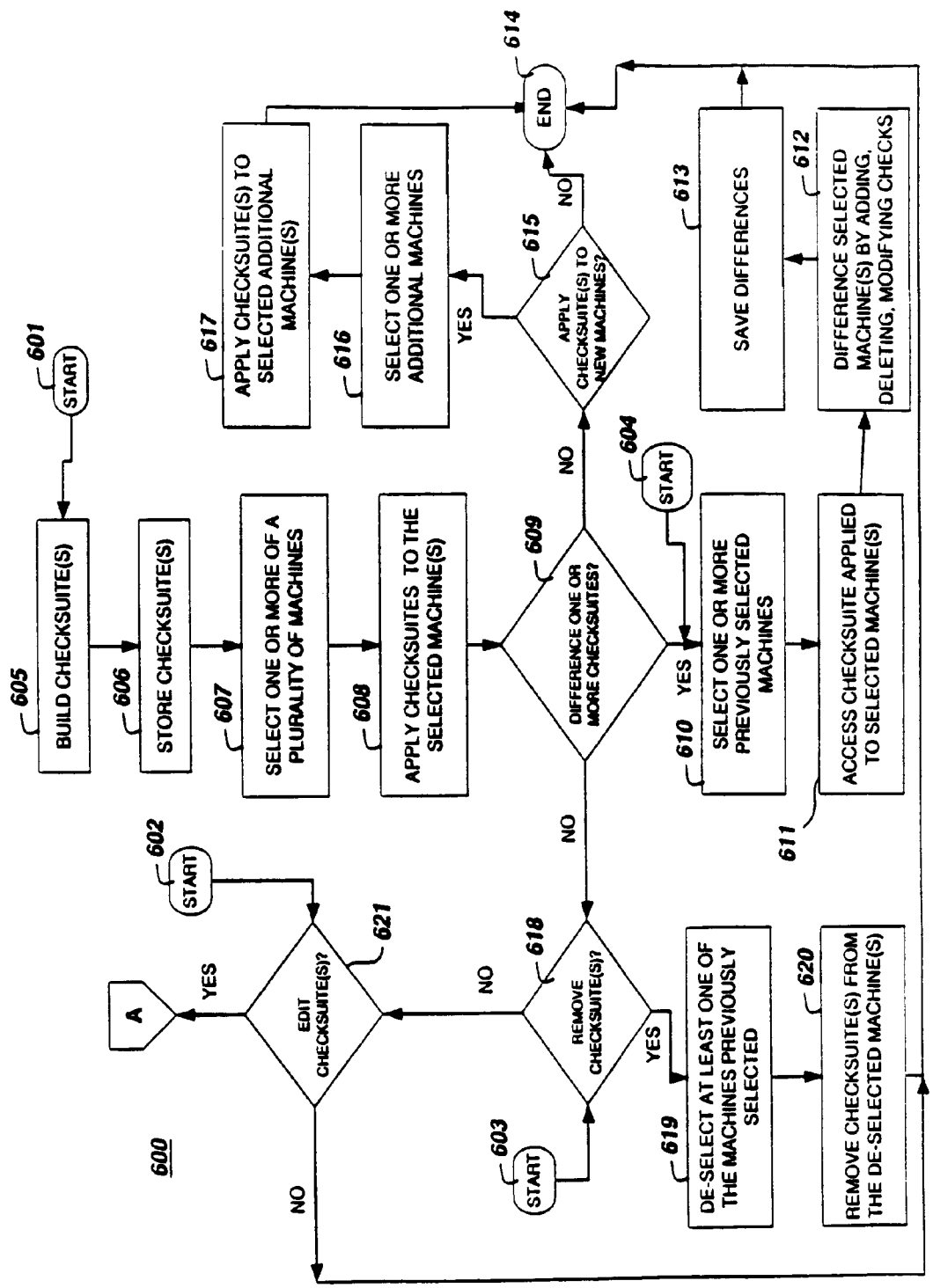
FIGS. 6A-6C are a flow chart of one embodiment of a method useable with the present invention.

FIG. 6A is a flow chart of another embodiment of a method 600 useable with the present invention. Method 600 preferably begins at step 601, but may begin at any of steps 602, 603, or 604.

Beginning at step 601, one or more checksuites may be built, step 605 and stored, step 606, as previously described with reference to FIG. 5, above. One or more of a plurality of computers may be selected, step 607, and one or more stored checksuites applied to them, step 608.

One or more stored checksuites are applied to one or more selected computer(s), step 608. At steps 609-614, the selected computer(s) are differenced (e.g., customized) by accessing a checksuite applied to the selected computer(s), step 611; differencing the accessed checksuite by adding, deleting, or modifying individual checks, step 612; and saving the differences step 613. Thereafter, method 600 terminates at step 614.

When no customizations (differences) are to be made, step 609, the stored checksuites are applied to one or more additional computers, step 615, by selecting one or more additional computers, step 616, and applying the selected checksuite(s) to the selected additional computer(s), step 617. Thereafter, method 600 terminates at step 614. A similar termination occurs if one or more stored checksuites are not to be applied to new computer(s) at step 615.

If no customizations (differences) are to be made, step 609, one or more previously applied checksuites may be removed, step 618, by de-selecting at least one of the computers previously selected, step 619, and removing (e.g., erasing) the selected checksuite(s) from the de-selected computer(s), step 620. Thereafter, method 600 terminates at step 614.

If no checksuites are to be removed, step 618, one or more checksuites may be edited or not, step 621. If not, method 600 terminates at step 614. If so, method 600 continues to FIG. 6B, and one or more checksuites may be selected for editing, step 622. The selected checksuites may be edited, step 623, by deleting individual checks, step 624, by adding individual checks, step 625, or by modifying individual checks, step 626.

Individual checks may be deleted, step 624, by selecting one or more checks to delete, step 627, and deleting the selected checks from them, step 628. In one embodiment, individual checks may be selected from a list from a collection of icons, or from a pull-down menu displayed in a browser or other network-enabled graphical user interface. Once selected, the checks may be deleted by activating a delete button displayed in a browser or other network-enabled graphical user interface, or by typing one or more predetermined keys on a keypad or keyboard associate with a display device. The edited checksuite(s) may be saved (stored), step 629, as previously described. Thereafter, method 600 may end, steps 634, 635, or continue as shown in FIG. 6C. The term "delete" as used herein means to erase or otherwise disassociate the selected individual checks from the stored and/or applied checksuite.

Individual checks may be added to a checksuite, step 625, by selecting the checks to be added, step 630, and adding the new checks to the checksuite, step 631. Once edited, the checksuite(s) may be saved (stored) for later retrieval, step 629.

Similarly, one or more individual checks may be modified, step 626, selecting the one or more individual checks to modify, step 632, and modifying the selected checks, step 633, by altering, adding, or deleting various parameters associated with each individual check. Once edited, the checksuite(s) may be saved (stored) for later retrieval, step 629. Thereafter, method 600 may end, steps 634, 635, or continue as shown in FIG. 6C.

Figure 6B:
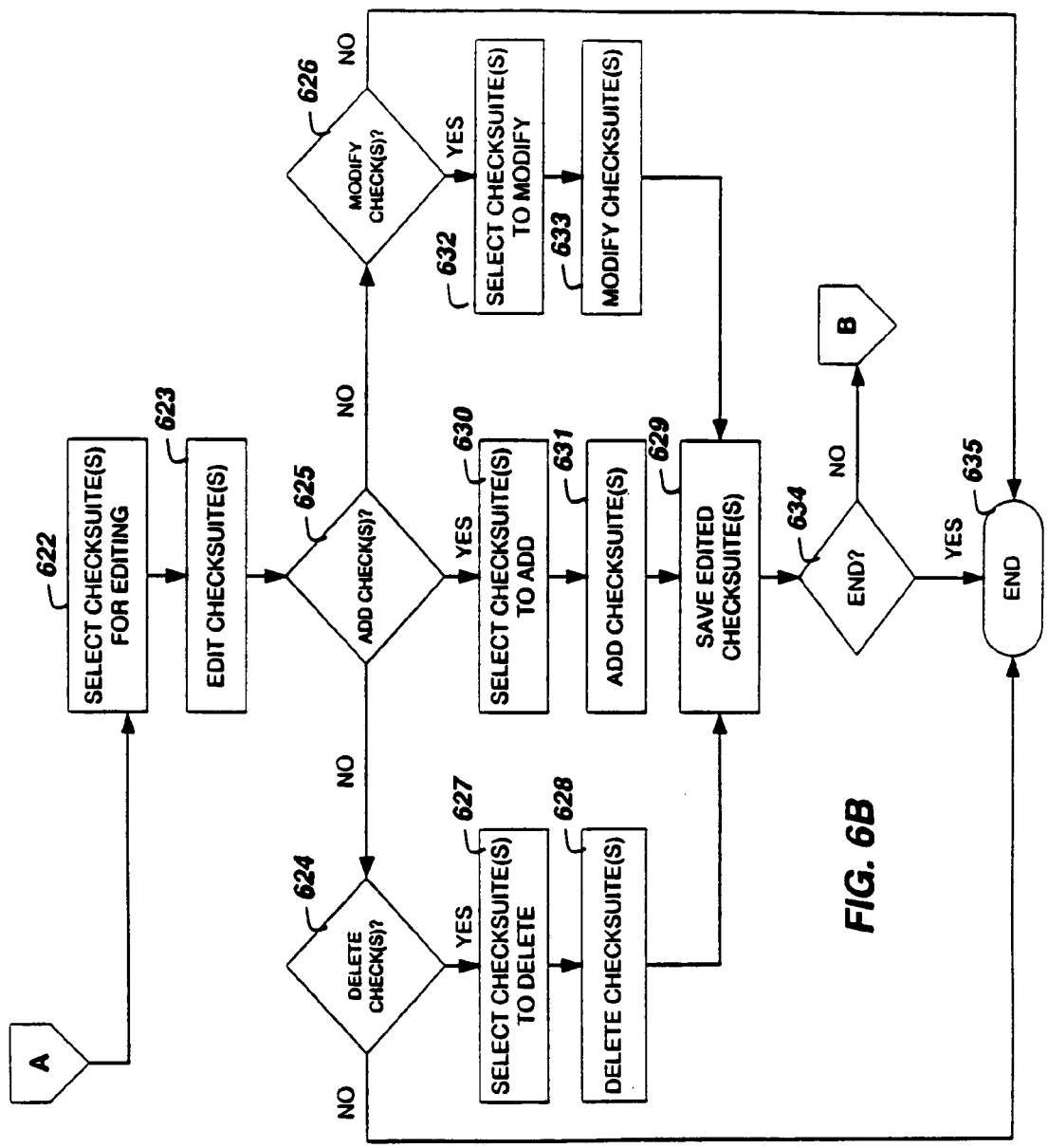
Figure 6C:
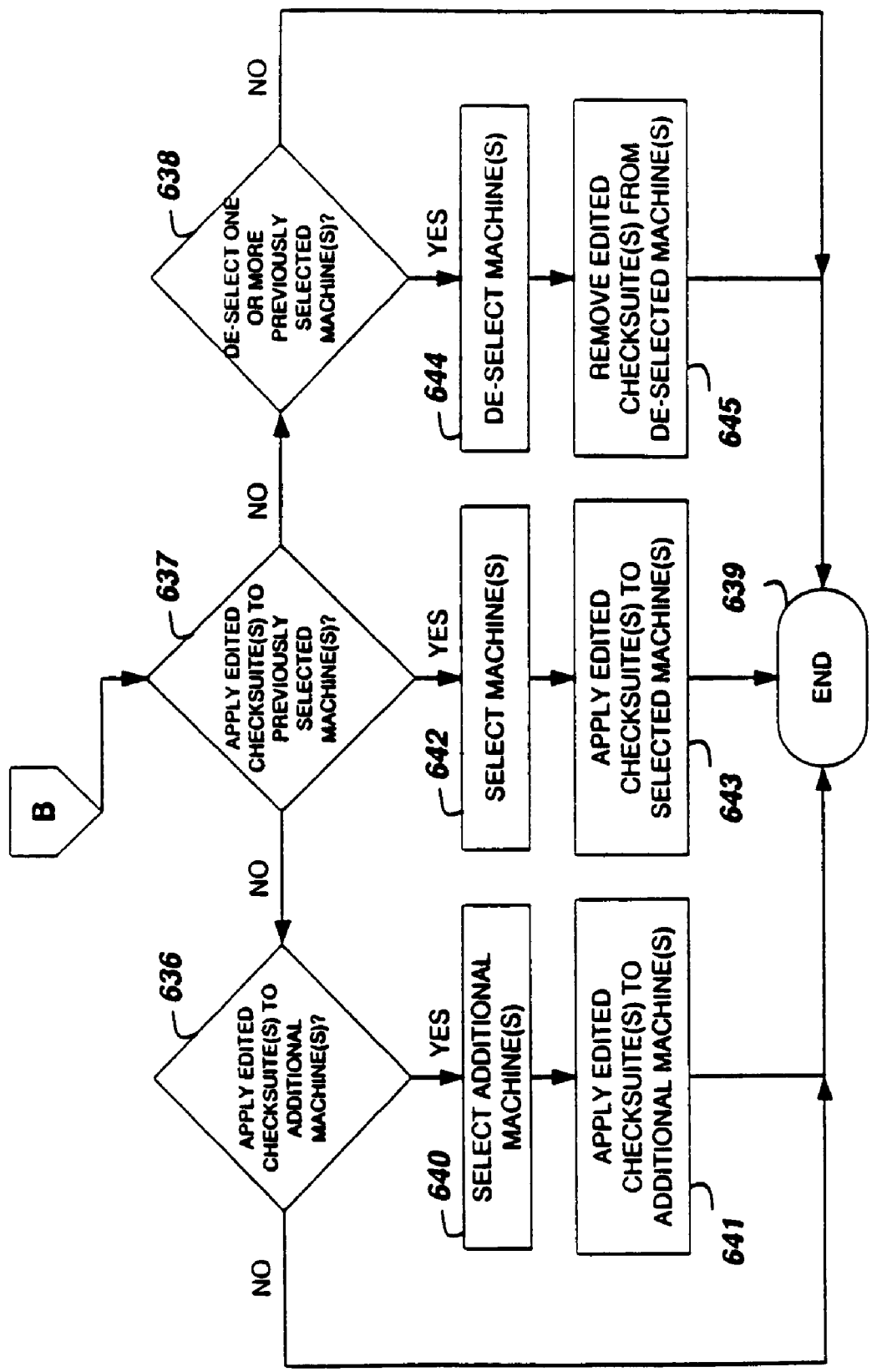

FIG. 6C is a continuation of method 600 shown in FIGS. 6A and 6B. Edited checksuites may be applied to additional computers, step 636, applied to previously selected computers, step 637, or de-selected from one or more previously selected computers, step 638. If none of these options are desired, method 600 terminates at end of step 639.

Edited checksuites may be applied to additional computers (e.g., computers added to the network), step 636, by selecting the additional computer(s), step 640, and applying the edited checksuites to the additional computer(s), step 641. In one embodiment, applying the edited checksuite(s) to the additional computer(s), step 641, preserves any differences (e.g., customizations) made to at least one of the additional computers. In another embodiment, applying the edited checksuite(s) to the additional computer(s), step 641, cancels any differences (e.g., customizations) made to at least one of the additional computers.

Edited checksuite(s) may be applied to previously selected computer(s) (e.g., computers already part of the network), step 637, by selecting one or more previously selected computers, step 642, and applying the edited checksuite(s) to the selected computers, step 643. In one embodiment, applying the edited checksuite(s) to one or more previously selected computers, step 643, preserves any differences (e.g., customizations) made to at least one of the previously selected computers.

In another embodiment, applying the edited checksuite(s) to one or more previously selected computers, step 643, cancels any differences (e.g., customizations) made to at least one of the previously selected computers.

Edited checksuite(s) applied to one or more previously selected computers may be de-selected, step 638, by de-selecting one or more previously selected computers, step 644, and removing the edited checksuite(s) from the de-selected computer(s), step 645. In one embodiment, removing the edited checksuite(s) from the de-selected computers, step 645, preserves any differences (e.g., customizations) made to at least one of the de-selected computers. In another embodiment, removing the edited checksuite(s) from the de-selected computers, step 645, cancels any differences (e.g., customizations) made to at least one of the de-selected computers.

Figure 7:
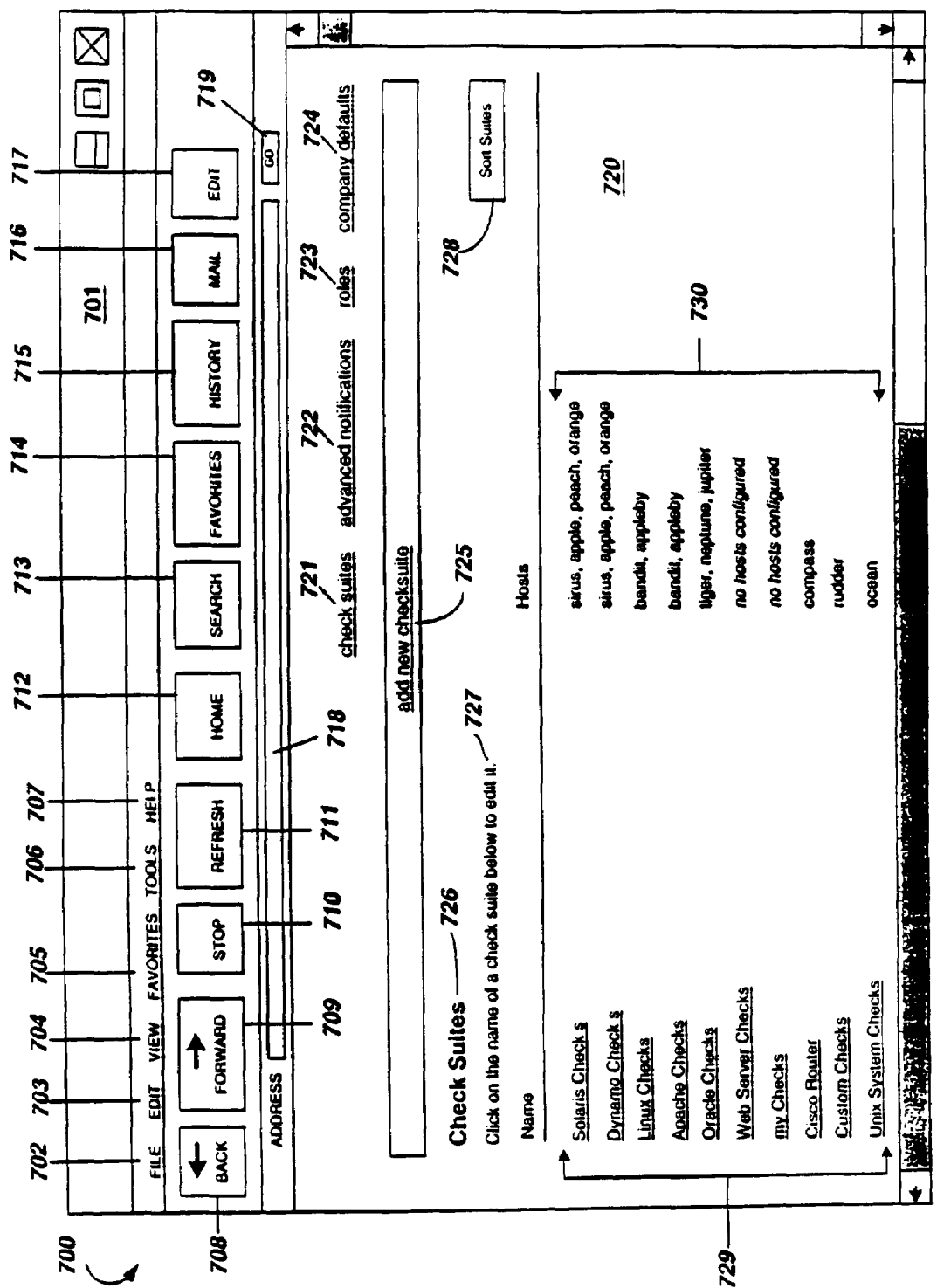
FIG. 7 is a screenshot illustrating a useful application and management of checksuites in a computer environment.

FIG. 7 is a screenshot of a browser 700 illustrating a useful application and management of checksuites in a computer environment. Browser 700 may be a popular browser program such as Microsoft Internet Explorer, made by Microsoft Corporation of Redmond, Wash., or Netscape Navigator, made by Netscape Communications of Mountain View, Calif. Alternatively, web browser 700 may be any other Internet connectable graphical user interface.

Browser 700 includes a browser window 701, which includes a plurality of pull-down menus 702-707, a plurality of buttons 708-717, an address bar 718, a "Go" button 719, and a viewing area 720. Illustratively, pull-down menus 702-707 may include a File, Edit, View, Favorites, Tools, and Help menus. Exemplary buttons 708-717 may include Back, Forward, Stop, Refresh, Home, Search, Favorites, History, Mail and Edit buttons. Address bar 718 displays a URL such as http://www.nocpulse.com, corresponding to the web page displayed in viewing area 720. If the URL is changed by a user, "Go" button 719 may be used to load a new web page into viewing area 720. Web browser 700 is displayed for a user on a display screen or monitor coupled with a computer or other Internet capable device.

Displayed within viewing area 720 is a page network computered by a remote server. As shown in FIG. 7, the web page may include hyperlinks 721-725, a title 726, user instructions 727, a sort suites button 728, a list of checksuites 729 and a corresponding list of network computers 730. Hyperlinks 721-725 may illustratively include a checksuites hyperlink, an advanced notifications hyperlink, a rules hyperlink, a company defaults hyperlink, and an add-new-checksuite hyperlink. Using a cursor control device to click on a hyperlink causes web browser 700 to load and display a new page particularly associated with that hyperlink. For example, clicking hyperlink 721 may display a web page listing currently applied checksuites. Similarly, clicking hyperlink 722 may display a web page detailing one or more notification features. In like manner, clicking hyperlink 724 may load a page displaying a list of default checksuites.

List 729 is a collection of the names of all of the individual checks configured by the customer. List 730 is a collection of the names of all the network computers that apply the corresponding checksuites in List 729. In one embodiment, names of the checksuites appearing in List 729 are hyperlinks to a checksuite notification page. Lists 729 and 730 may be sorted using button 728.

Figure 8:
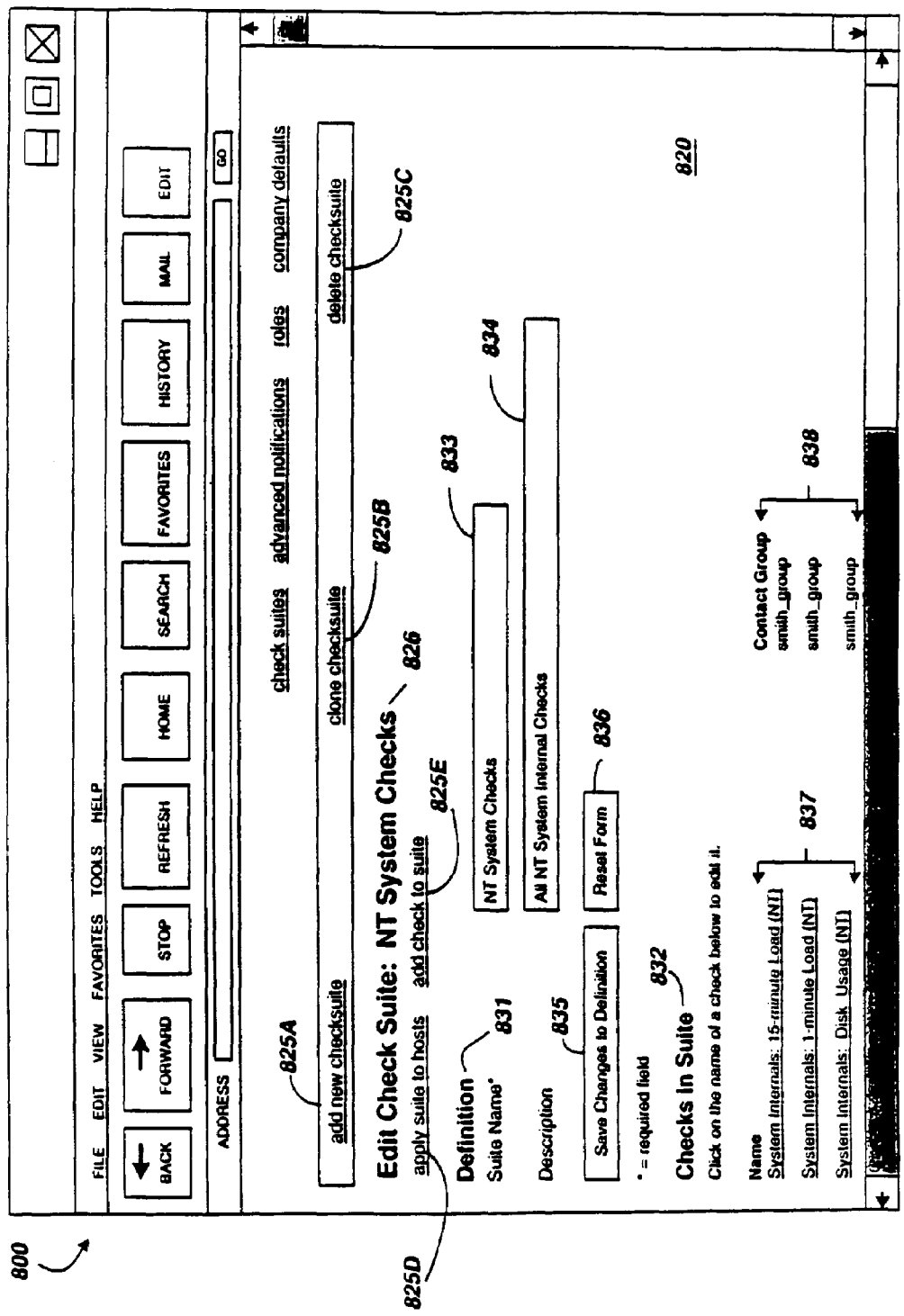
FIG. 8 is a screenshot illustrating the editing of checksuites in a computer environment, according to one embodiment of the present invention.

FIG. 8 is a screenshot of a web browser illustrating an application and management of checksuites in a computer environment. Browser 800 corresponds to browser 700 appearing in FIG. 7, but displays a different page in viewing area 820. The new page includes hyperlinks 825A, 825B, 825C, 825D and 825E, and a new title 826. The page also includes a Definition area 831 and a Checks in Suite Area 832. The Suite name field 833 allows a user to change the name of a checksuite, and Description field 834 allows a user to modify the description of the checksuite. In FIG. 8, the checksuite is named "NT SYSTEM CHECKS" and is described as "All NT System Internal Checks." Clicking button 835 saves any changes made to the Definition area 831. Clicking button 836 clears text from fields 833 and 834.

The checks in Suite section includes a list 837 of the names of individual checks that are included in the checksuite. Clicking on a name hyperlink in list 837 causes web browser 800 to display a checksuites modification screen. List 838 is a collection of emails, pagers, phones, or other contact methods that may be notified according to the output statuses of the various checks. The clone checksuite hyperlink 825B allows a user to duplicate an existing checksuite for later differencing (e.g., customization).

Figure 9:
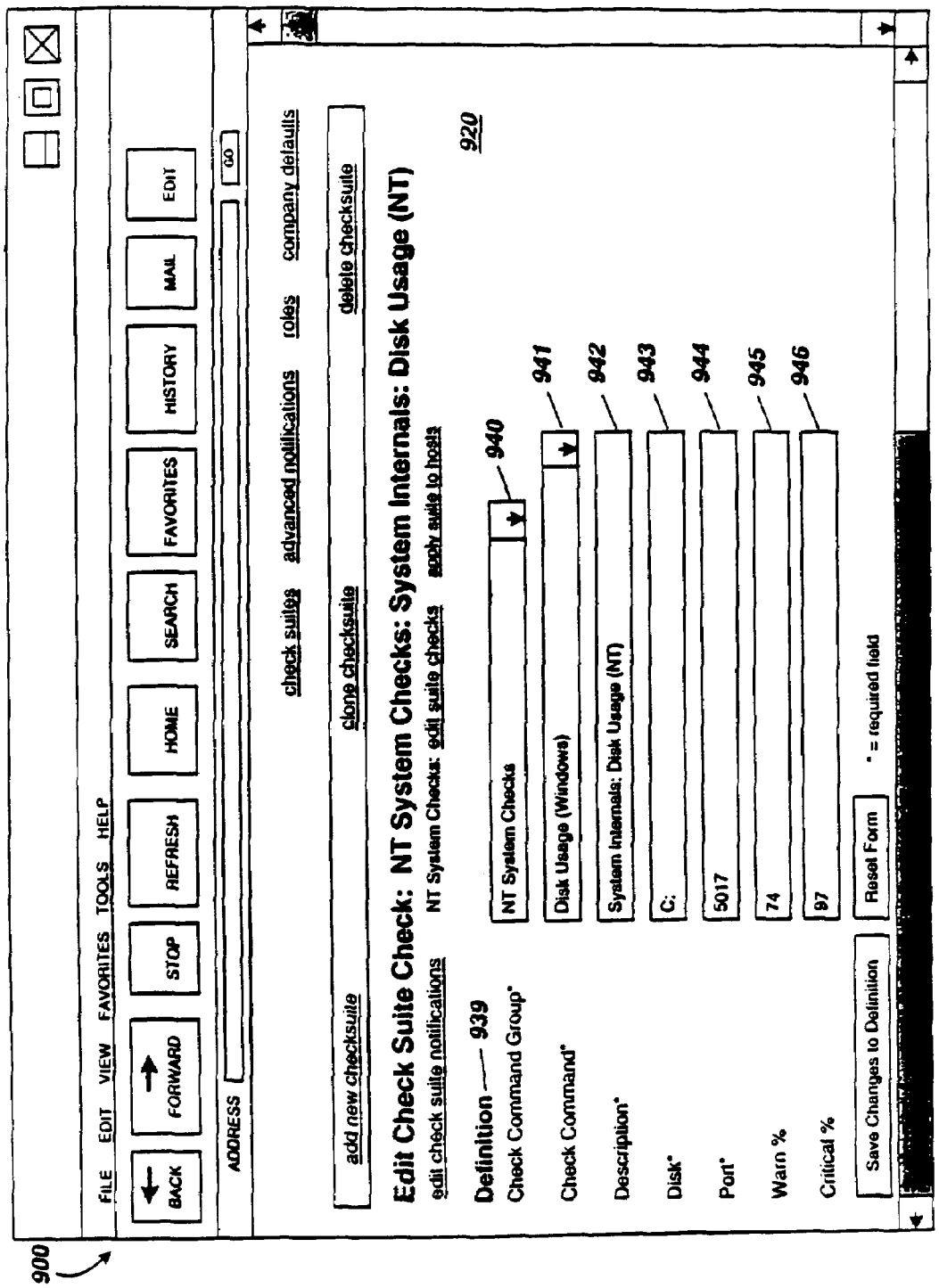
FIG. 9 is a screenshot illustrating the editing of a checksuite check in a computer environment, according to one embodiment of the present invention.

FIG. 9 is a screenshot of a web browser 900 illustrating a useful application and management of checksuites in a computer environment. Browser 900 corresponds to web browsers 700 and 800 in FIGS. 7 and 8. However, a new page is displayed in viewing area 920. The new page allows a user to edit (e.g., modify) a check that is already part of a checksuite. Modifications made on this page will affect all instances of the check.

Definition Area 939 includes a plurality of user modifiable fields 940-946 that allow a user to give "Definition Parameters" 943-944 that help define the object of the check (here, which disk, which port). Fields 945-946 also allow a user to define various thresholds (Here: Warn % and Critical %). It will be appreciated that the screenshot is not limited to the fields shown, but may also include additional "Definition Parameter" and other "threshold" fields.

In one embodiment, field 940 defines the main category to which the individual check belongs. In FIG. 9, this main category is NT System checks. Field 941 defines the type of check, here a check that measures the amount of disk space consumed by a Microsoft Windows operating system. Field 942 describes and categorizes the type of the individual check, here, the individual check measures disk usage, which is an internal systems operation. Thus, the check is described as "System Internals: disk Usage (NT)."

Figure 10:
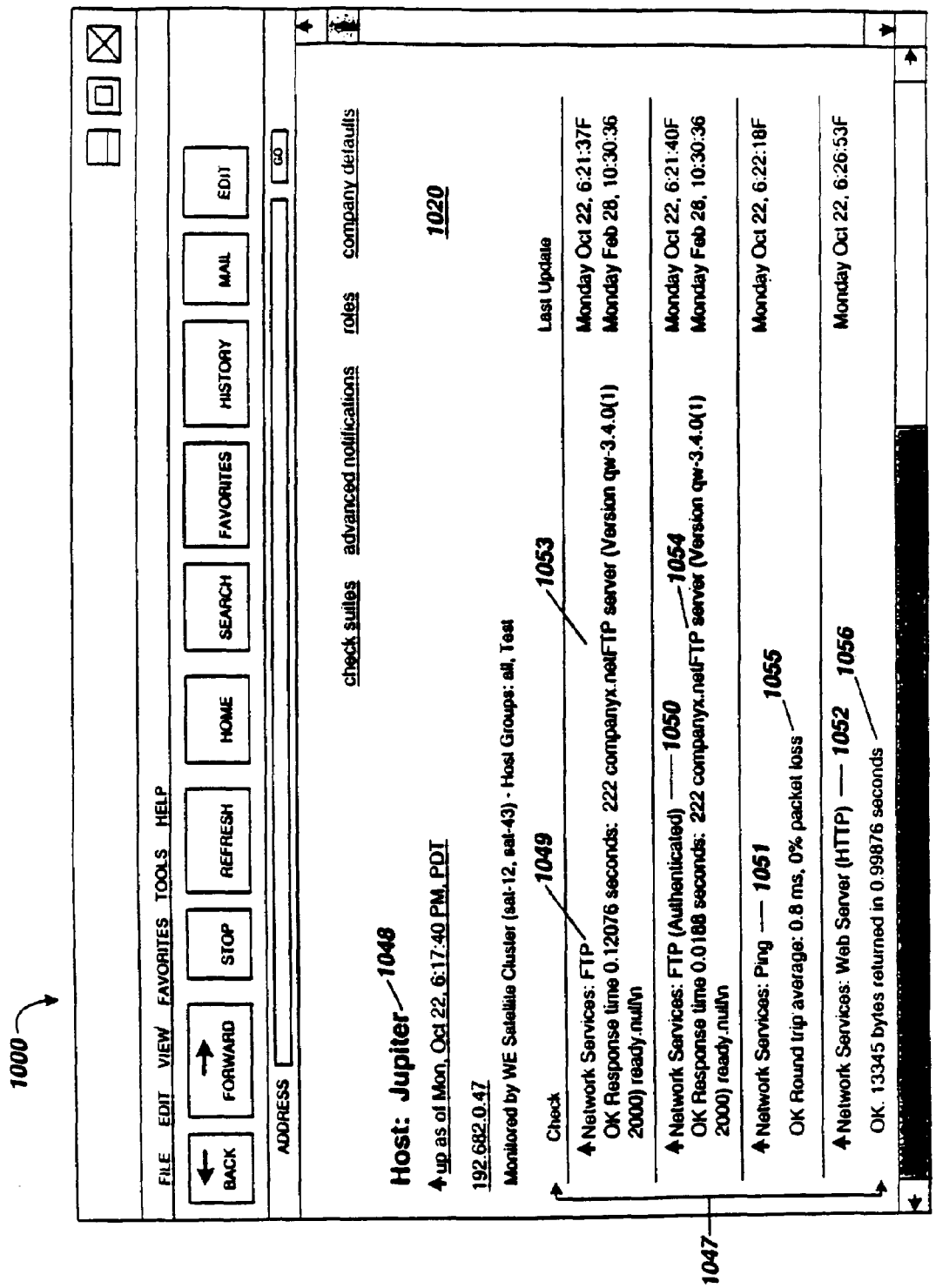
FIG. 10 is a screenshot illustrating the status of a network computer to which a plurality of check suites have been applied.

FIG. 10 is a screenshot of a web browser 1000 illustrating a useful application and management of checksuites in a computer environment. Web browser 1000 corresponds to web browsers 700, 800, and 900 in FIGS. 7-9, but displays a new page in its viewing area 1020. This new page displays a list 1047 of checks that are applied against a Network computer 1048. In one embodiment, List 1047 may include checks defined at the checksuite level, and those defined at the individual check level. A pencil icon (or other icon) placed before or near the name of a check may represent that the check was configured at the individual level.

List 1047 may include the names 1049-1052 of the checks, as well as check outputs 1053-1056. Check outputs 1053-1056 may display real-time data generated by operation of each of checks 1049-1052, and the check outputs 1053-1056 may be highlighted.

Figure 11:
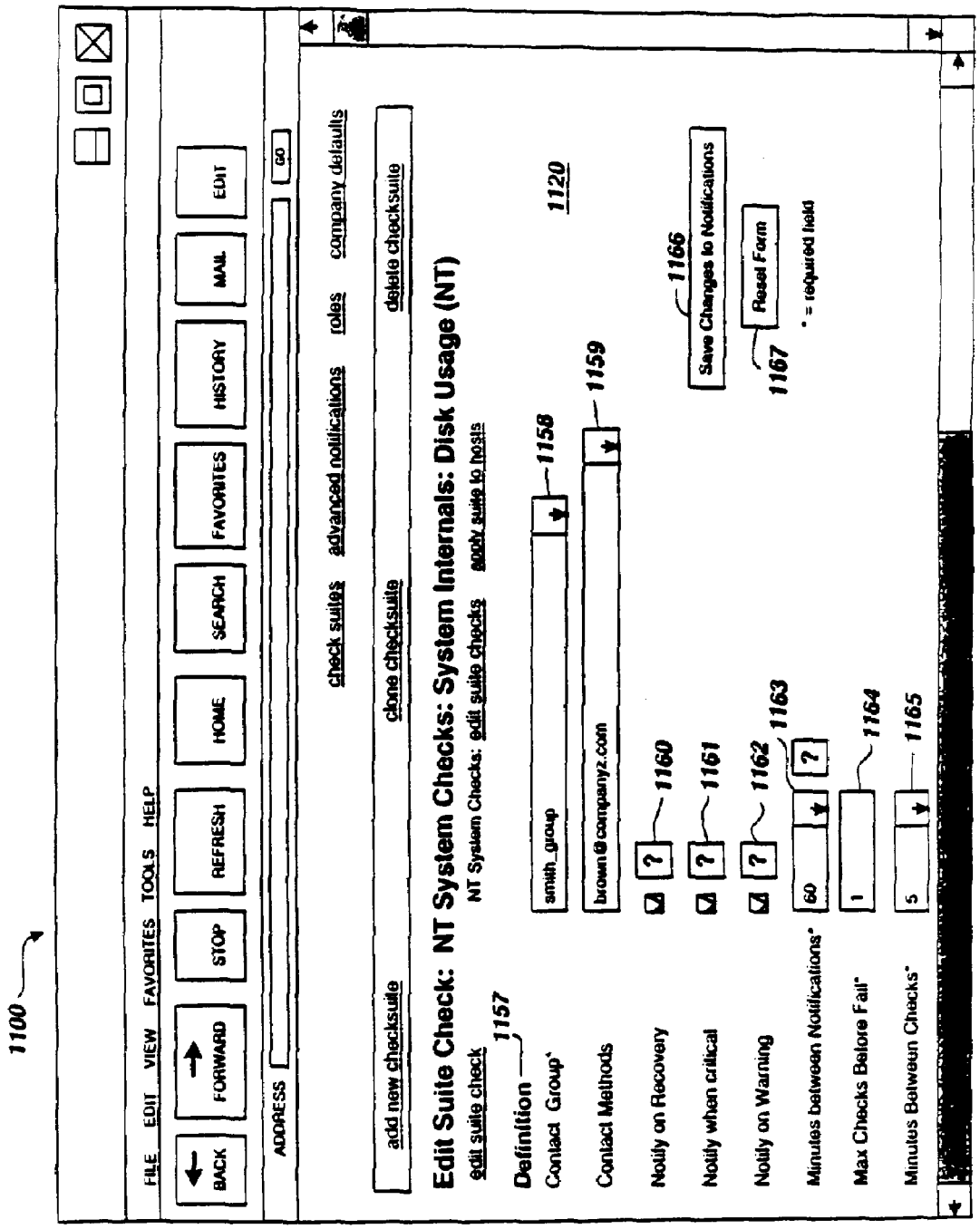
FIG. 11 is a screenshot illustrating how checksuite notifications may be edited, according to one embodiment of the invention.

FIG. 11 is a screenshot of a browser 1100 illustrating a useful application and management of checksuites in a computer environment. Browser 1100 corresponds to web browsers 700, 800, 900, and 1000 in FIGS. 7-10, but displays a new page in its viewing area 1120. The new page allows a user to change the notification rules for any check that is already part of a checksuite, and any changes here will affect all instances of the check.

Definition Section 1157 includes a plurality of user modifiable fields 1158-1165. Fields 1158 and 1159 allow a user to designate who will be contacted and/or a contact group to be contacted. Fields 1160-1162 allow a user to specify when notification occurs; e.g., on recovery, when critical, or on warning. Fields 1163-1165 allow a user to specify the number of minutes between notifications, the maximum number of checks before fail, and the minutes between checks. Clicking button 1166 saves any changes made to the notifications web page. Clicking button 1167 resets fields 1158-1165 to blank or default values.

Figure 12:
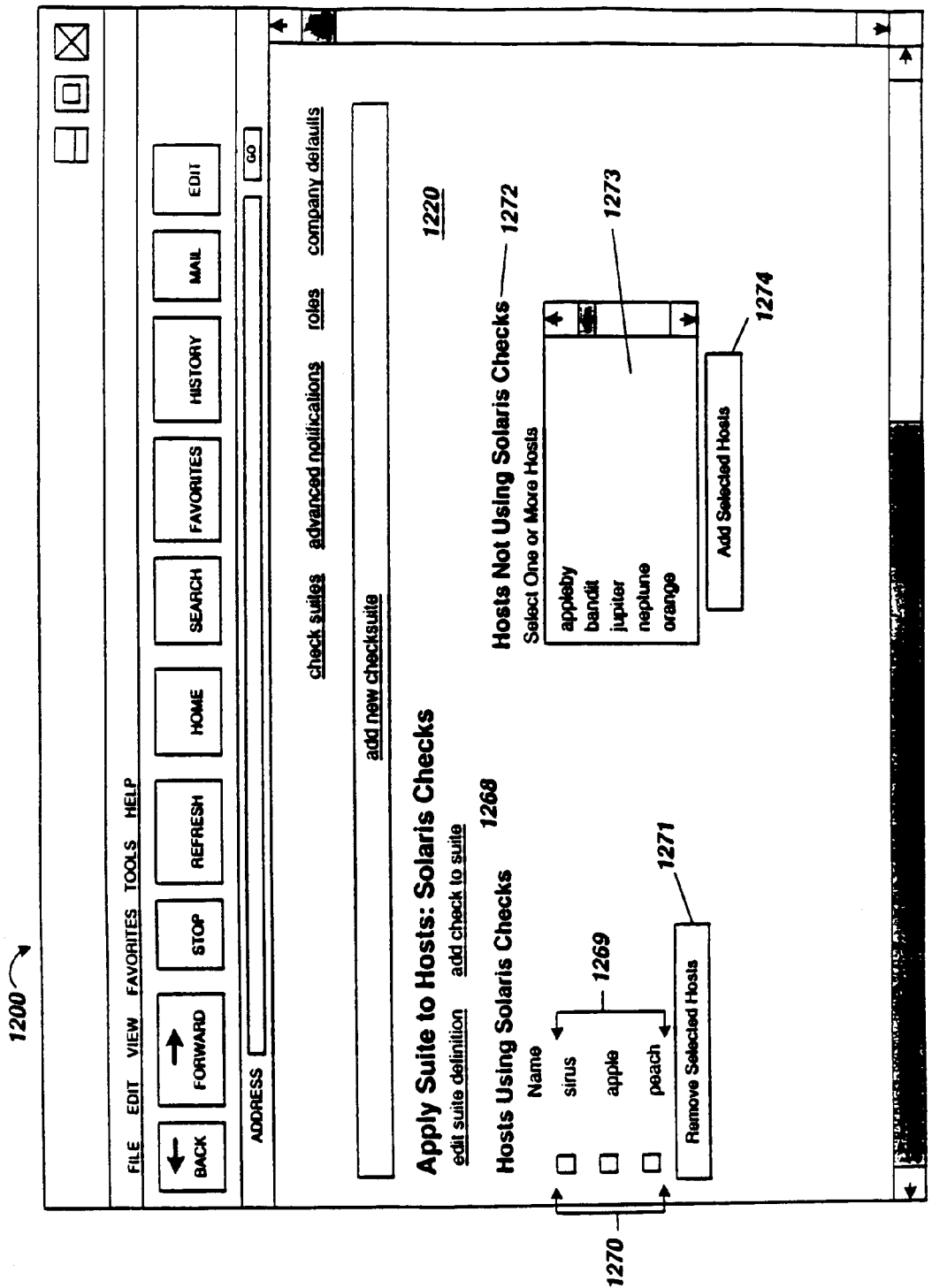
FIG. 12 is a screenshot illustrating the application of checksuites to (or their removal from) a network computer network device, according to one embodiment of the invention.

FIG. 12 is a screenshot of a browser 1200 illustrating a useful application and management of checksuites in a computer environment. Browser 1200 corresponds to browsers 700, 800, 900, 1000 and 1100 in FIGS. 7-11, but displays a new page in its viewing area 1220. The new page allows a user to modify the network computer(s) to which a particular checksuite is applied. The network computers not using Checks area 1268 includes a list 1269 of network computer names, and a corresponding number of selection boxes 1270. Clicking button 1271 removes any selected network computers the checksuite. Thus, when a user removes a network computer, the checks in the checksuite will no longer be applied to that network computer.

Similarly, Network Computers Not Using Checks area 1272 may include a list 1273 of the names of network computers not using Solaris checks. In one embodiment, list 1273 includes only the names of network computers that are compatible with the selected check. Network computers may be added to a check or checksuite by highlighting their name(s) in list 1273 and clicking on button 1274. Thus, when a user adds a particular network computer to a checksuite, each check defined for that checksuite suite is applied to that network computer moving forward.

Figure 13:
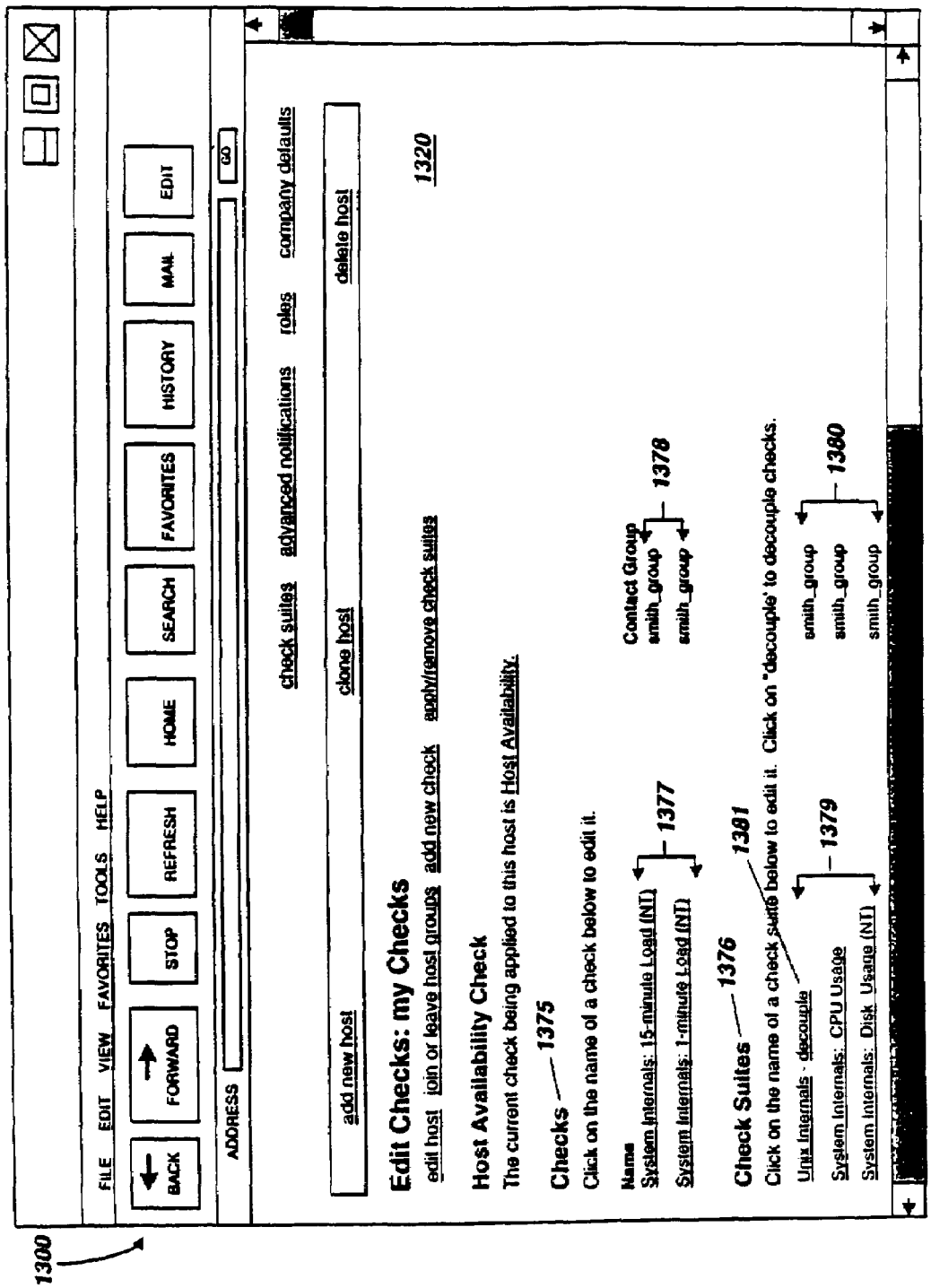
FIG. 13 is a screenshot illustrating a master list of checks and checksuites that may be decoupled from a network computer, or added to, edited, or deleted from the master list.

FIG. 13 is a screenshot of a browser 1300 illustrating an application and management of checksuites in a computer environment. Browser 1300 corresponds to browsers 700, 800, 900, 1000, 1100 and 1200 in FIGS. 7-12, but displays a new page in its viewing section 1320. This page displays a Master list of checks 1375 and checksuites 1376 applied to a network computer. Check area 1375 includes a list 1377 of individual checks, and a corresponding list 1378 of various contact groups. In one embodiment, a user may edit a check by clicking on its name in list 1377.

Checksuites Area 1376 includes a list 1379 of checksuites by name and a corresponding list 1380 of contact groups. A user may check on the name of a checksuite appearing in list 1379 to edit the checksuite. Clicking hyperlink 1381 decouples (disassociates) a checksuite from a network computer or network computers. The decouple feature is useful where a user wishes to apply a suite of checks to a set of network computers, but each network computer has both unique and common information. In this situation, after applying a suite of checks with the common information to the network computer, the suite of checks may be disassociated from the network computer or network computers using the decouple feature. This changes the suite of checks to checks as if they had been applied to the network computer individually, and the user may thus be allowed to make changes to the parameters as they apply to that network computer. In one embodiment, decoupling results in any link to the suite being lost and unrecoverable without first removing the checks from the network computer and reapplying the suite.

Figure 15:
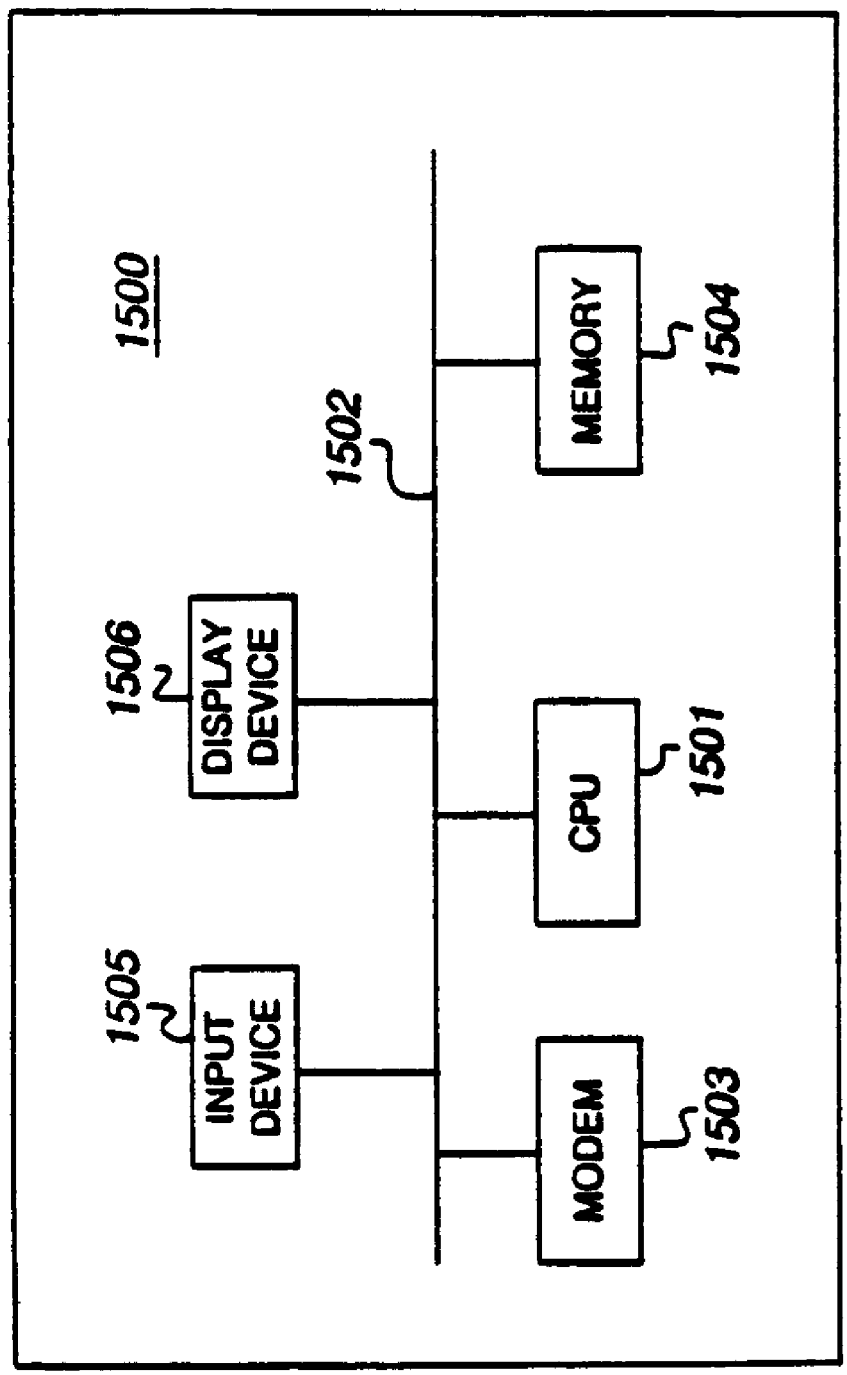
FIG. 15 is a diagram of a computer useable with embodiments of the pressing invention.

FIG. 15 is a diagram of a computer system 1500. Computer system 1500 includes, but is not limited to, the following components: central processing unit (CPU) 1501, bus 1502, modem 1503, memory 1504, input device 1505, and display device 1506. CPU 1501 is a processor such as an Intel or Macintosh processor. Alternatively, other types of processors may be used. Bus 1502 connects processor 1501 with the other components of system 1500. Memory 1504 is random access memory (RAM). Alternatively, other types of memory may be coupled with bus 1502. Modem 1503 may be a digital, wireless, or analog modem. Input device 1505 is a keyboard, cursor control device, touch screen, or other type of input device. Display device 1506 is a flat panel display. Alternatively, other types of display devices may be used.

Figure 16:
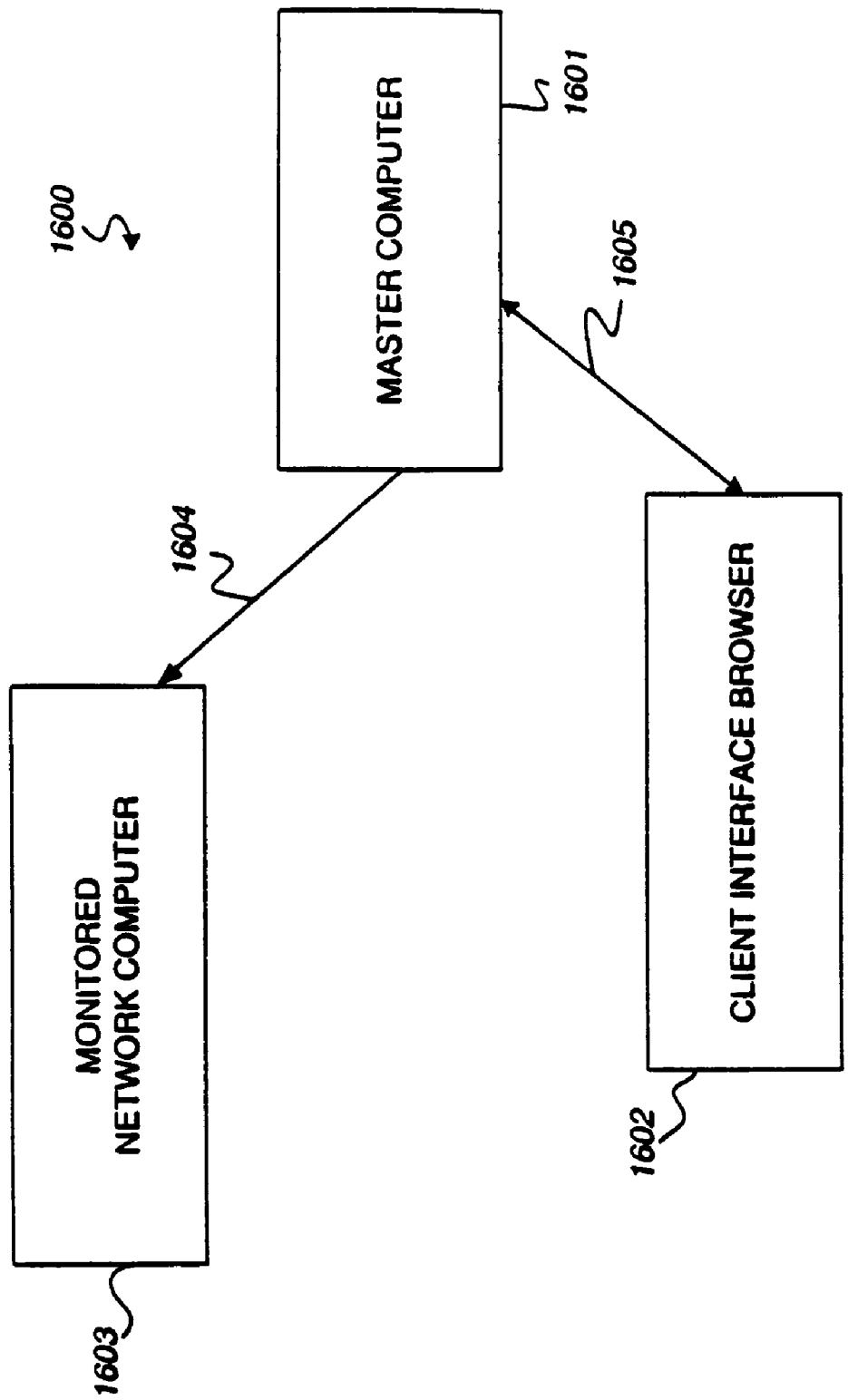
FIG. 16 is a diagram of a network useable with embodiments of the present invention.

FIG. 16 is a diagram showing one embodiment of a server 1600. Server 1600 includes a server 1601, client browser 1602, network computer 1603, and communication links 1604 and 1605. Master computer 1601 stores, fetches, and provides computer-readable program code, which changes the appearance of pages displayed within browser 1602, and which alters the configuration of network computer 1603. In one embodiment, this program code includes sets of computer-executable instructions that correspond to one or more pre-defined operating system and/or software program parameters. Alternatively, multiple sets of the computer-executable instructions are grouped together to form checksuites.

In use, a user manipulates data displayed in browser 1603 to command master computer 1601 to create, store, retrieve, modify, delete, or apply one or more checks to network computer(s) 1603. Though not shown, additional network computers may be linked to master computer 1601 so that checks and checksuites may be applied to multiple network computers simultaneously. Additionally, master computer 1601 automatically runs the checks and outputs the results to browser 1602 for viewing by the user.

Thus, a method and apparatus for building, editing, storing, and applying checksuites to a computer network is disclosed. Although the present invention is described herein with reference to a particular embodiment, many modifications and variations therein will readily occur to those with ordinary skill in the art. Accordingly, all such variations and modifications are included within the intended scope of the present invention as defined by the following claims.

What is claimed is:

1. A method of monitoring a computer network, comprising:
   receiving, by a server computer, commands identifying a checksuite from a web browser, the checksuite including one or more individual checks, each check being configured to monitor a parameter of an operating system or a software program that runs on an operating system, wherein the checksuite includes first individual checks that monitor parameters of a first operating system and second individual checks that monitor parameters of a second operating system that is different from the first operating system, and wherein the first individual checks monitor the parameters of the first operating system concurrent to the second individual checks monitoring the parameters of the second operating system;

selecting, by the server computer, the checksuite based on the commands, wherein an original version of the checksuite having been deployed to two or more previously selected machines having different operating systems, and wherein subsequent to being deployed to the two or more previously selected machines, the checksuite was customized for a first machine of the two or more previously selected machines, a customized version of the checksuite having one or more customizations, the customizations corresponding to checks that differ from checks in the original version of the checksuite;

receiving, by the server computer, additional commands for editing the checksuite from the web browser;

editing, by the server computer, the checksuite based on the additional commands, the editing including at least one of removing an existing individual check from the checksuite, modifying the existing individual check, or adding a new individual check to the checksuite; and simultaneously deploying the edited checksuite to the first machine, which includes the first operating system, and a second machine that includes the second operating system, wherein the first machine and the second machine, respectively, are each one of the two or more previously selected machines or one or more additional machines, and wherein deploying the edited checksuite to the first machine preserves the one or more customizations.

2. The method of claim 1, wherein editing the checksuite further comprises:
adding one or more new individual checks to the checksuite; and
deploying the edited checksuite to the two or more previously selected machines, the deploying comprising:
deploying the one or more new individual checks to the two or more previously selected machines.

3. The method of claim 2, further comprising:
selecting the one or more additional machines to receive the edited checksuite; and
deploying the edited checksuite to the newly selected machines.

4. The method of claim 2, further comprising:
de-selecting at least one of the two or more machines previously selected; and
removing the edited checksuite from the deselected machines.

5. The method of claim 1, wherein editing the checksuite further comprises:
removing one or more individual checks from the checksuite; and
deploying the edited checksuite to the two or more previously selected machines, the deploying comprising:
deleting the removed individual check from the two or more previously selected machines.

6. The method of claim 5, further comprising:
selecting the one or more additional machines to receive the edited checksuite; and
deploying the edited checksuite to the newly selected machines.

7. The method of claim 5, further comprising:
de-selecting at least one of the two or more machines previously selected; and
deleting the edited checksuite from the de-selected machines.

8. The method of claim 1, wherein editing the checksuite further comprises:
modifying one or more individual checks within the checksuite; and
deploying the edited checksuite to the two or more previously selected machines, the deploying comprising:
deploying the modified individual check to the two or more previously selected machines.

9. The method of claim 8, further comprising:
selecting the one or more additional machines to receive the edited checksuite; and
deploying the edited checksuite to the newly selected machines.

10. The method of claim 8, further comprising:
de-selecting at least one of the two or more machines previously selected; and
removing the edited checksuite from the de-selected machines.

11. The method of claim 1, wherein the customizations include at least one of a threshold reporting level and a type of notification to be activated when a problem is detected.

12. The method of claim 1, wherein the customizations include a specific type of monitoring to be performed, the specific type of monitoring being one of a continuous monitoring or a periodic monitoring.

13. A machine-readable medium including program code, which when executed by a processor causes the processor to perform the following:
receiving, by a server computer, commands identifying a checksuite from a web browser, the checksuite including one or more individual checks, each check being configured to monitor a parameter of an operating system or a software program that runs on an operating system, wherein the checksuite includes first individual checks that monitor parameters of a first operating system and second individual checks that monitor parameters of a second operating system that is different from the first operating system, and wherein the first individual checks monitor the parameters of the first operating system concurrent to the second individual checks monitoring the parameters of the second operating system;

selecting, by the server computer, the checksuite based on the commands, wherein an original version of the checksuite having been deployed to two or more previously selected machines having different operating systems, and wherein subsequent to being deployed to the two or more previously selected machines, the checksuite was customized for a first machine of the two or more previously selected machines, a customized version of the checksuite having one or more customizations, the customizations corresponding to checks that differ from checks in the original version of the checksuite;

receiving, by the server computer, additional commands for editing the checksuite from the web browser;

editing, by the server computer, the checksuite based on the additional commands, the editing including at least one of removing an existing individual check from the checksuite, modifying the existing individual check, or adding a new individual check to the checksuite; and simultaneously deploying the edited checksuite to the first machine, which includes the first operating system, and a second machine that includes the second operating system, wherein the first machine and the second machine, respectively, are each one of the two or more previously selected machines or one or more additional machines, and wherein deploying the edited checksuite to the first machine preserves the one or more customizations.

14. The machine-readable medium of claim 13, which causes the processor to further perform:
adding one or more individual checks to the checksuite; and
deploying the edited checksuite to the two or more previously selected machines.

15. The machine-readable medium of claim 14, which causes the processor to further perform:
selecting the one or more additional machines to receive the edited checksuite; and
deploying the edited checksuite to the newly selected machines.

16. The machine-readable medium of claim 14, which causes the processor to further perform:
de-selecting at least one of the two or more machines previously selected; and
removing the edited checksuite from the de-selected machines.

17. The machine-readable medium of claim 13, which causes the processor to further perform:
deleting one or more individual checks from the checksuite; and
deploying the edited checksuite to the two or more previously selected machines.

18. The machine-readable medium of claim 17, which causes the processor to further perform:
selecting the one or more additional machines to receive the edited checksuite; and
deploying the edited checksuite to the newly selected machines.

19. The machine-readable medium of claim 17, which causes the processor to further perform:
de-selecting at least one of the two of more machines previously selected; and
removing the edited checksuite from the de-selected machines.

20. The machine-readable medium of claim 13, which causes the processor to further perform:
modifying one or more individual checks within the checksuite; and
deploying the edited checksuite to the two or more previously selected machines.

21. The machine-readable medium of claim 20, which causes the processor to further perform:
selecting the one or more additional machines to receive the edited checksuite; and
deploying the edited checksuite to the newly selected machines.

22. The machine-readable medium of claim 20, which causes the processor to further perform:
de-selecting at least one of the two or more machines previously selected; and
removing the edited checksuite from the de-selected machines.

23. A method comprising:
receiving, by a server computer, a request to select a checksuite for editing from a web browser, the checksuite including one or more individual checks, each check being configured to monitor a parameter of an operating system or a software program that runs on an operating system, wherein the checksuite includes first individual checks that monitor parameters of a first operating system and second individual checks that monitor parameters of a second operating system that is different from the first operating system, and wherein the first individual checks monitor the parameters of the first operating system concurrent to the second individual checks monitoring the parameters of the second operating system;
selecting, by the server computer, the requested checksuite, wherein an original version of the checksuite having been deployed to two or more previously selected machines, and wherein subsequent to being deployed, the checksuite was customized for a first machine of the two or more previously selected machines, a customized version of the checksuite having one or more customizations, the customizations corresponding to checks that differ from checks in the original version of the checksuite;
editing the checksuite based on commands received from the web browser, the editing including at least one of removing an existing individual check from the checksuite, modifying the existing individual check, or adding a new individual check to the checksuite; and
deploying the edited checksuite to the first machine, which includes the first operating system, and to a second machine that includes the second operating system, wherein the first machine and the second machine, respectively, are each one of the two or more previously selected machines or one or more additional machines, and wherein deploying the edited checksuite to the first machine preserves the one or more customizations.

24. The method of claim 23, wherein editing the checksuite further comprises:
receiving changes made to the selected checksuite;
receiving a request to save the changes made to the selected checksuite; and
saving the changes made to the selected checksuite.

25. The method of claim 23, wherein editing the checksuite further comprises:
receiving new individual checks;
adding the new individual checks to the selected checksuite;
saving the selected checksuite as modified; and
deploying the modified checksuite to the two or more previously selected machines.

26. The method of claim 23, wherein editing the checksuite further comprises:
receiving a request to select one or more of the individual checks;
selecting the requested one or more individual checks;
receiving a request to delete the selected one or more individual checks;
deleting the selected one or more individual checks;
receiving a request to save the checksuite as modified;
saving the modified checksuite; and
deploying the modified checksuite to the two or more machines previously selected.

27. The method of claim 23, wherein editing the checksuite further comprises:
receiving a request to select one or more individual checks within the checksuite;
selecting the one or more requested individual checks;
receiving a modification of at least one parameter of the one or more selected individual checks;
receiving a request to save the one or more individual checks as modified; and saving the one or more modified individual checks.

28. The method of claim 27, further comprising:

receiving a request to deploy the checksuite containing the one or more modified individual checks to the two or more previously selected machines; and deploying the checksuite containing the one or more modified individual checks to the one or more previously selected machines.

29. An apparatus, comprising:

a memory to store instructions; and a processor, coupled to the memory, to execute the instructions, the instructions causing the processor:

to receive commands identifying a checksuite from a web browser, wherein the checksuite includes one or more individual checks, each check being configured to monitor a parameter of an operating system or a software program that runs on an operating system, wherein the checksuite includes first individual checks that monitor parameters of a first operating system and second individual checks that monitor parameters of a second operating system that is different from the first operating system, and wherein the first individual checks monitor the parameters of the first operating system concurrent to the second individual checks monitoring the parameters of the second operating system, to select the identified checksuite, wherein an original version of the checksuite having been deployed to two or more previously selected machines having different operating systems, and wherein subsequent to being deployed to the two or more previously selected machines, the checksuite was customized for a first machine of the two or more previously selected machines, a customized version of the checksuite having one or more customizations, the customizations corresponding to checks that differ from checks in the original version of the checksuite, to edit the checksuite based on the commands received from the web browser, the editing including at least one of removing an existing individual check from the checksuite, modifying the existing individual check, or adding a new individual check to the checksuite, and to simultaneously deploy the edited checksuite to the first machine, which includes the first operating system, and to a second machine that includes the second operating system, wherein the first machine and the second machine, respectively, are each one of the two or more previously selected machines or one or more additional machines, and wherein deploying the edited checksuite to the first machine preserves the one or more customizations.

30. An apparatus as in claim 29, wherein the instructions cause the processor to edit the checksuite by performing at least one of adding one or more new individual checks to the checksuite, deleting one or more individual checks from the checksuite, or modifying one or more individual checks within the checksuite.

31. An apparatus as in claim 30, wherein the instructions further cause the processor to select the one or more additional machines to receive the edited checksuite, and to deploy the edited checksuite to the newly selected machines.

32. An apparatus as in claim 30, wherein the instructions further cause the processor to de-select at least one of the two or more machines previously selected, and to remove the edited checksuite from the deselected machines.

33. An apparatus as claimed in claim 29, wherein the instructions further cause the processor to receive a command to select the checksuite, and to receive a command to edit the checksuite.

* * * * *